(12) United States Patent  
Oodaira

(10) Patent No.: US 9,266,397 B2
(45) Date of Patent: Feb. 23, 2016

(54) PNEUMATIC TIRE

(75) Inventor: Hiroshi Oodaira, Suginami-ku (JP)

(73) Assignee: BRIDGESTONE CORPORATION, Tokyo (JP)

( * ) Notice: Subject to any disclaimer, the term of this patent is extended or adjusted under 35 U.S.C. 154(b) by 509 days.

(21) Appl. No.: 13/634,141

(22) PCT Filed: Mar. 10, 2011

(86) PCT No.: PCT/JP2011/001418
§ 371 (c)(1),
(2), (4) Date: Sep. 11, 2012

(87) PCT Pub. No.: WO2011/111394
PCT Pub. Date: Sep. 15, 2011

(65) Prior Publication Data
US 2013/0000805 A1 Jan. 3, 2013

(30) Foreign Application Priority Data

Mar. 12, 2010 (JP) ................. 2010-056714
Mar. 12, 2010 (JP) ................. 2010-056726
Feb. 2, 2011 (JP) ................. 2011-021103

(51) Int. Cl.
B60C 11/12 (2006.01)
B60C 11/11 (2006.01)

(52) U.S. Cl.
CPC ............ B60C 11/11 (2013.01); B60C 11/1263 (2013.04); B60C 11/1281 (2013.04);
(Continued)

(58) Field of Classification Search
CPC .... B60C 11/11; B60C 11/12; B60C 11/1204; B60C 11/1236; B60C 11/1218; B60C 2011/1213; B60C 2011/0372; B60C 2011/1245; B60C 2011/1254; B60C 2011/1286
USPC ................................. 152/209.28
See application file for complete search history.

(56) References Cited

U.S. PATENT DOCUMENTS 5,873,399 A * 2/1999 Ochi et al. ................ 152/209.2
6,427,737 B1 8/2002 Katayama
(Continued)

FOREIGN PATENT DOCUMENTS

CA 2080328 * 7/2003
CA 2080328 C 7/2003
(Continued)

OTHER PUBLICATIONS

English machine translation of JP05-330319, dated Dec. 1993.*
(Continued)

Primary Examiner — Steven D Maki
Assistant Examiner — Robert Dye
(74) Attorney, Agent, or Firm — Sughrue Mion, PLLC

(57) ABSTRACT

Provided is a pneumatic tire improved in on-ice friction properties of the tire, which is excellent in on-ice performance, in particular, on-ice braking performance. The pneumatic tire according to the present invention includes, in a tread portion surface located between both tread ends, a plurality of main grooves extending in a tire circumferential direction; a plurality of lateral grooves extending in a tire width direction, the lateral grooves each having one bent point so as to be in a convex shape in the tire circumferential direction between the main grooves and/or between the main groove and the tread end, the plurality of main grooves and the plurality of lateral grooves partition-forming a plurality of blocks each including a circumferential protrusion in a shape conforming to the convex shape of the lateral groove, the blocks each including at least one lateral sipe extending in the tire width direction in a shape conforming to the lateral grooves, in which the lateral sipe is equal in tire-width-direction dimension to the block having the lateral sipe disposed therein when both are projected onto the same plane which includes the tire rotation axis and is perpendicular to the block surface.

9 Claims, 14 Drawing Sheets

(52) U.S. Cl.
CPC . *B60C2011/0372* (2013.04); *B60C 2011/1209* (2013.04); *B60C 2011/1213* (2013.04); *B60C 2011/1227* (2013.04); *B60C 2011/1245* (2013.04); *B60C 2011/1254* (2013.04); *B60C 2011/1268* (2013.04); *B60C 2011/1286* (2013.04)

(56) References Cited

U.S. PATENT DOCUMENTS

| | | | | |
|---|---|---|---|---|
| 6,571,844 | B1* | 6/2003 | Ochi | B60C 11/11 152/209.18 |
| 2007/0089821 | A1* | 4/2007 | Kishizoe | 152/209.2 |

FOREIGN PATENT DOCUMENTS

| | | | |
|---|---|---|---|
| CN | 1853965 | A | 11/2006 |
| EP | 0788899 | A1 | 8/1997 |
| EP | 1070606 | A2 | 1/2001 |
| EP | 2 546 076 | A1 | 1/2013 |
| JP | 63-279904 | A | 11/1988 |
| JP | 02-189205 | A | 7/1990 |
| JP | 2-267009 | A | 10/1990 |
| JP | 03-010913 | A | 1/1991 |
| JP | 3-92402 | A | 4/1991 |
| JP | 04-365608 | A | 12/1992 |
| JP | 05-112105 | A | 5/1993 |
| JP | 05-178032 | A | 7/1993 |
| JP | 5-330319 | A | 12/1993 |
| JP | 06-143943 | A | 5/1994 |
| JP | 07-186633 | A | 7/1995 |
| JP | 9-164815 | A | 6/1997 |
| JP | 2000-006619 | A | 1/2000 |
| JP | 2001-1722 | A | 1/2001 |
| JP | 2001-30720 | A | 2/2001 |
| JP | 2001-63321 | A | 3/2001 |
| JP | 2002-192917 | A | 7/2002 |
| JP | 2003-118320 | A | 4/2003 |
| JP | 2009-166762 | A | 7/2009 |

OTHER PUBLICATIONS

English machine translation of JP06-143943, dated May 1994.*
Extended European Search Report, dated Oct. 16, 2013, issued in corresponding European Patent Application No. 11753057.6.
International Search Report of PCT/JP2011/001418 dated Apr. 5, 2011.
Japanese Office Action, dated Jul. 1, 2014, issued in corresponding Japanese Patent Application No. 2012-504339. English translation.
Russian Office Action, dated Feb. 4, 2014, issued in corresponding Russian Patent Application No. 2012143620. English translation.
Chinese Office Action, dated Jul. 24, 2014, issued in corresponding Chinese Patent Application No. 201180022480.6. English translation.
Communication dated Apr. 14, 2015, issued by the European Patent Office in counterpart Application No. 14195811.6.
Communication dated Feb. 10, 2015 from the Japanese Patent Office in counterpart application No. 2014-176625.
Communication dated Feb. 10, 2015 from the Japanese Patent Office in counterpart application No. 2014-176627.
Communication dated Feb. 10, 2015 from the Japanese Patent Office in counterpart application No. 2014-176626.
Communication dated Sep. 15, 2015 from the Japanese Patent Office in counterpart application No. 2014-176625.
Communication dated Sep. 15, 2015 from the Japanese Patent Office in counterpart application No. 2014-176626.

* cited by examiner

FIG. 5
(a)
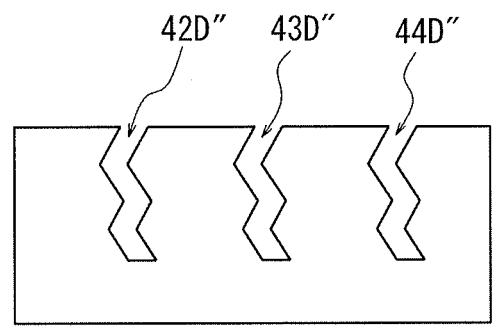
(b)
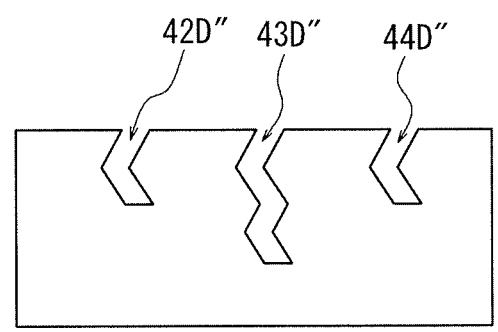

FIG. 9
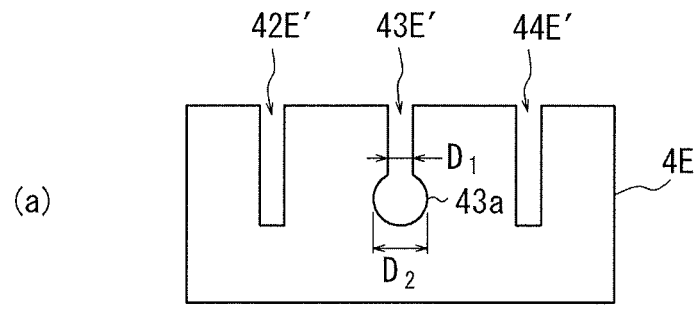
(a)
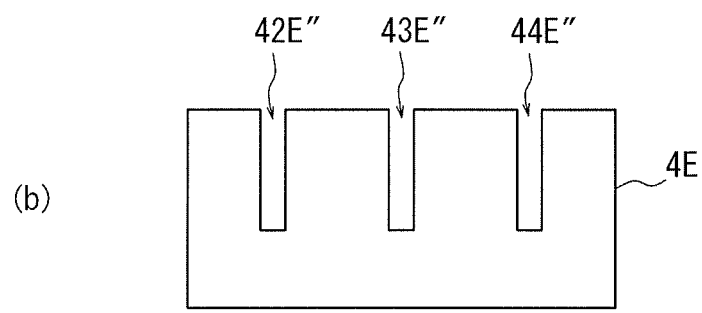
(b)
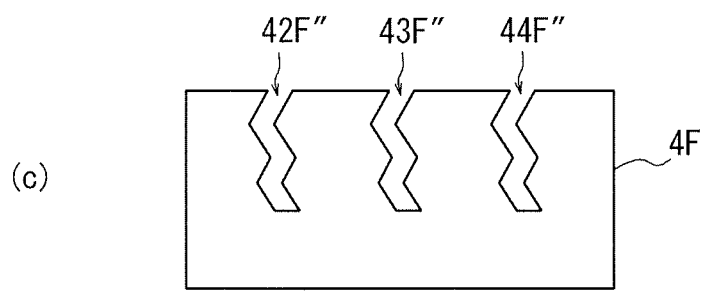
(c)
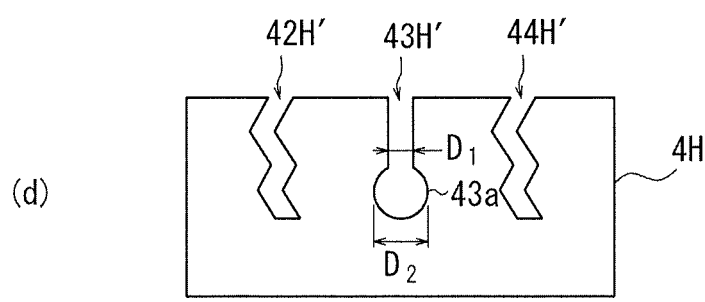
(d)

FIG. 13
(a)
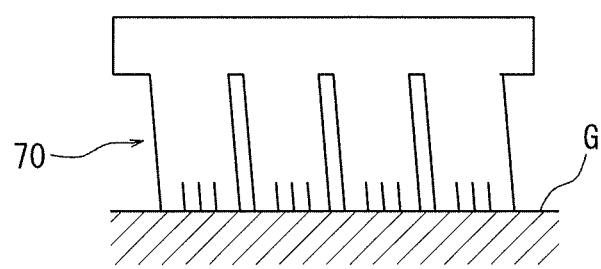
(b)
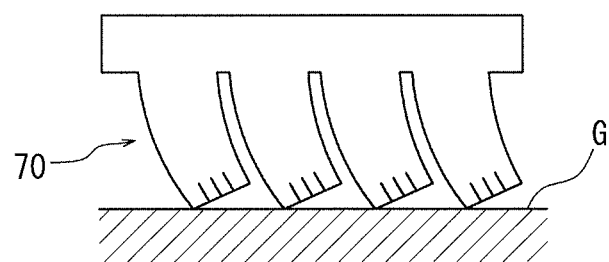

PNEUMATIC TIRE

CROSS-REFERENCE TO RELATED APPLICATIONS

This application is a National Stage of International Application No. PCT/JP2011/001418 filed Mar. 10, 2011, claiming priority based on Japanese Application Nos. 2010-056726 filed Mar. 12, 2010, JP 2010-056714 filed Mar. 12, 2010 and JP 2011-021103 filed Feb. 2, 2011, the contents of all of which are incorporated by reference in their entirety.

TECHNICAL FIELD

The present invention relates to a pneumatic tire, and more particularly to a pneumatic tire excellent in on-ice performance.

BACKGROUND ART

Generally, there is a demand for a tire excellent in on-ice performance, in particular, on-ice braking performance, as a pneumatic tire suited for use on an icy road.

Here, the braking performance and the traction performance of a tire are usually subject to influence of the friction properties of the tire. Therefore, in order to improve the on-ice braking performance of the tire, the on-ice friction properties of the tire need to be improved.

There are known various methods to improve the on-ice friction properties of a tire. Such methods include ensuring the ground-contact area of the tire, and improving the scratch effect to be produced by the edges of blocks and the edges of sipes formed on the tread portion against an icy road.

However, in a conventional pneumatic tire having a plurality of main grooves extending along the tire circumferential direction and a plurality of lateral grooves extending along the tire width direction formed on a tread portion surface so that rectangular blocks are partition-formed, and having sipes formed in the blocks (see, for example, JP H07-186633 A), when the blocks 70 are increased in rigidity so that the blocks 70 can be prevented from being inclined to thereby ensure the ground-contact area of the tire as can be seen from FIG. 13(a) schematically illustrating a state of the blocks during running, the scratch effect to be produced by the edges against an icy road G cannot be fully obtained. Meanwhile, in the conventional pneumatic tire, as can be seen from FIG. 13(b) schematically illustrating another state of the blocks during running, when the inclination of the blocks 70 is enhanced for the purpose of obtaining the scratch effect of the edges against the icy road G, the kick-out end side of each of the blocks 70 comes off the road surface, failing to ensure the ground-contact area.

DISCLOSURE OF THE INVENTION

Problems to be Solved by the Invention

For the reasons as described above, the conventional pneumatic tires are incapable of ensuring the ground-contact area of the tire while simultaneously improving the scratch effect to be produced by the edges against an icy road, and hence sufficient on-ice friction properties cannot be obtained.

In view of the above, the present invention has an object to provide a pneumatic tire which is capable of ensuring the ground-contact area of the tire while simultaneously improving the scratch effect to be produced by the edges against an icy road, to thereby increase on-ice friction properties of the tire, so as to improve the on-ice performance, in particular, on-ice braking performance.

Means for Solving the Problem

It is an object of the present invention to advantageously solve the aforementioned problems, and therefore, a pneumatic tire of the present invention includes, at least in part of a tread portion surface located between both tread ends: a plurality of main grooves extending in a tire circumferential direction; and a plurality of lateral grooves extending in a tire width direction, the lateral grooves each having one bent point so as to be in a convex shape in the tire circumferential direction between the main grooves and/or between the main groove and the tread end, the plurality of main grooves and the plurality of lateral grooves partition-forming a plurality of blocks each having a circumferential protrusion in a shape conforming to the convex shape of the lateral groove, the blocks each having at least one lateral sipe extending in the tire width direction in a shape conforming to the lateral grooves, in which the lateral sipe is equal in tire-width-direction dimension to the block having the lateral sipe disposed therein when both are projected onto the same plane which includes the tire rotation axis and is perpendicular to the block surface.

As described above, lateral grooves each having one bent point so as to be in a convex shape in the tire circumferential direction are formed on the tread portion surface in order to partition-form blocks each having a circumferential protrusion, so that the ground-contact area can be ensured while improving the scratch effect to be produced by the edges of the blocks against an icy road. Further, the lateral sipes may be formed across the entire region of each block in the tire width direction in relation to the view from tire circumferential direction, so that the edge component can be sufficiently ensured to thereby improve the scratch effect to be produced by the edges of the lateral sipes against an icy road. Therefore, the ground-contact area of the tire can be ensured while simultaneously improving the scratch effect to be produced by the edges against an icy road, to thereby improve the on-ice friction performance of the tire. As a result, a pneumatic tire excellent in on-ice performance can be obtained.

Here, according to the present invention, "the lateral groove has one bent point", which means that the groove walls of the lateral groove (that is, side walls on the lateral groove side of the blocks formed on both sides of the lateral groove in the tire circumferential direction) each have, in plan view, one bent point. Further, the "tire-width-direction dimension of the lateral sipe which is obtained when the lateral sipe is projected onto a plane which includes the tire rotation axis and is perpendicular to the block surface" refers to a tire-width-direction dimension in a projection view which is obtained when the lateral sipes are projected onto the same plane.

Here, in the pneumatic tire of the present invention, the block is preferably larger in dimension in the tire width direction than in the tire circumferential direction. With the tire-width-direction dimension of the block being larger than the tire-circumferential-direction dimension, the block can be increased in length across both edges in the tire circumferential direction and also increased in length of the lateral sipes, so that the scratch effect to be produced by the edges of the blocks and of the lateral sipes against an icy road can be improved. Also, the blocks are allowed to be inclined as appropriate, to thereby improve the scratch effect to be produced by the edges against an icy road.

Here, in the present invention, the "tire-width-direction dimension of the block" refers to a dimension of the block that is longest in the tire width direction. Further, the "tire-circumferential-direction dimension of the block" refers to a dimension of the block that is longest in the tire circumferential direction.

Further, in the pneumatic tire of the present invention, the block preferably has at least three lateral sipes formed therein, and at least one of the lateral sipes located between the lateral sipes located on both end sides of the block in the tire circumferential direction is preferably formed as a bottom-enlarged sipe having an enlarged portion at the bottom thereof. With at least one of the lateral sipes located between the lateral sipes located on both end sides of the block in the tire circumferential direction being formed as a bottom-enlarged sipe, a water film generated between an icy road and the tire can be thoroughly removed while attaining sufficient ground-contact area and improvement in the scratch effect to be produced by the edges against an icy road. Further, the sufficient removal of a water film allows the tire to be brought into close contact with an icy road surface, to thereby ensure the sufficient grip of the tire. That is, the ground-contact area of the tire can be ensured while simultaneously improving the scratch effect to be produced by the edges against an icy road, and the removal effect of a water film by the sipe can be improved, to thereby improve the on-ice friction performance of the tire. As a result, a pneumatic tire excellent in on-ice performance can be obtained.

Here, in the present invention, when a sipe "has an enlarged portion at the bottom thereof", the sipe has an enlarged portion at least in part of the bottom of the sipe, the enlarged portion being larger in width in the tire circumferential direction as compared to the opening width of the sipe in the tire circumferential direction on the tread portion surface.

Further, in the pneumatic tire of the present invention, the block preferably has a side wall located on the circumferential protrusion side, the side wall including two side wall portions that are different from each other in installation angle, and the side wall portions are preferably installed toward the apex of the circumferential protrusion at installation angles each preferably falling within a range of 15° to 45° relative to the tire width direction. The installation angles $\theta_1$, $\theta_2$ of the two side wall portions located on the circumferential protrusion side of the block are defined to fall within a range of 15° to 45° relative to the tire width direction, so that the scratch effect to be produced by the edges against an icy road can be particularly improved.

In the present invention, the "apex of the circumferential protrusion" refers to a point where lines along the side wall portions located on the circumferential protrusion side of the block intersect each other in plan view. Further, the installation angles $\theta_1$, $\theta_2$ of the side wall portions may be equal to each other or different from each other.

Further, in the pneumatic tire of the present invention, the lateral sipe preferably includes a combined lateral sipes including a pair of a first sipe and a second sipe, the first sipe having one end thereof opened to one main groove or tread end and the other end thereof terminated within the block or opened to a lateral groove, the second sipe having one end thereof opened to the other main groove or tread end and the other end thereof terminated within the block or opened to a lateral groove, in which the first sipe preferably has a tire-width-direction dimensional component preferably overlapping with a tire-width-direction dimensional component of the second sipe in a projection view obtained by projecting the first sipe and the second sipe onto the same plane which includes the tire rotation axis and is perpendicular to the block surface. The first sipe and the second sipe are configured to overlap each other within the block in relation to the view from tire circumferential direction, so that the edge component can be sufficiently ensured to thereby improve the scratch effect to be produced by the edges of the lateral sipes against an icy road.

Further, in the pneumatic tire of the present invention, the apex of the circumferential protrusion is preferably disposed as being offset from a width center line of the block by 10% to 30% of the block width. The apex of the circumferential protrusion is disposed as being offset by 10% to 30% of the block width, so that the scratch effect to be produced by the edges against an icy road can further be increased.

In the present invention, the "block width" refers to a tire-width-direction dimension of the block in a projection view which is obtained when the block is projected onto a plane which includes the tire rotation axis and is perpendicular to the block surface.

Further, in the pneumatic tire of the present invention, the lateral sipe preferably includes: a first sipe component having one end thereof opened to a main groove or a tread end located on the apex side of the circumferential protrusion relative to the width center line of the block; and a second sipe component having one end thereof opened to the other main groove or tread end, in which the second sipe component is preferably three-dimensionally formed so as to be bent in both the extending direction and the depth direction. When the apex of the circumferential protrusion is offset-arranged, the formation of a so-called three-dimensional sipe in a region on the width center line side of the block relative to the apex of the circumferential protrusion of the block can further effectively attain both the sufficient ground-contact area and the scratch effect to be produced by the edges against an icy road.

Here, in the present invention, "the lateral sipe includes a first sipe component and a second sipe component", which means that the lateral sipe (including a combined lateral sipe) includes two portions (sipe components) having different extending directions relative to the tire width direction. Further, the "extending direction of the sipe component" refers to an extending direction of a line passing through the center in the amplitude direction of the sipe component in a case where the sipe component is extended as being bent.

Further, in the pneumatic tire of the present invention, the second sipe component preferably has a slit portion with a cut depth shallower than other portion in the second sipe component. The slit portion thus provided prevents the blocks from being excessively inclined, to thereby sufficiently ensure the ground-contact area.

Further, in the pneumatic tire of the present invention, the block has three or more of the lateral sipes, in which the lateral sipes each preferably includes: a first sipe component having one end thereof opened to a main groove or a tread end located on the apex side of the circumferential protrusion relative to the width center line of the block; and a second sipe component having one end thereof opened to the other main groove or tread end, and in which the first sipe component of the lateral sipe on both end sides of the block in the tire circumferential direction is preferably formed as being bent in the extending direction while linearly arranged in the depth direction, or three-dimensionally formed so as to be bent in both the extending direction and the depth direction. When the apex of the circumferential protrusion is offset-arranged, the first sipe component of each of the lateral sipes located on both end sides of the block in the tire circumferential direction may be formed as a sipe that is bent in the extending direction while being linearly arranged in the depth direction, or as a so-called three-dimensional sipe, so that the sufficient ground-contact area and the improvement in the scratch effect to be produced by the edges against an icy road can both be attained more effectively.

Further, in the pneumatic tire of the present invention, the lateral groove preferably includes: a first lateral groove component having one end thereof opened to a main groove or a tread end located on the apex side of the circumferential protrusion relative to the width center line of the block; and a second lateral groove component having one end thereof opened to the other main groove or tread end, and the first lateral groove component preferably has a groove width narrower than the groove width of the second lateral groove component. In the case where the apex of the circumferential protrusion is offset-arranged, the groove width of the first lateral groove component may be formed narrower than the groove width of the second lateral grove component, so that the blocks adjacent to each other in the tire circumferential direction can be positioned close to each other on the first lateral groove component side, to thereby increase the rigidity of the block. That is, the rigidity of the blocks can be increased while improving the on-ice performance, to thereby improve performance, in particular, braking performance, on a dry road and on a wet road.

Further, in the pneumatic tire of the present invention, the block has two or more of the lateral sipes, and the lateral sipes located on both end sides of the block in the tire circumferential direction each preferably have a cut depth on the opening portion side shallower than at least one of the cut depth of a portion other than the opening of the lateral sipes located on both end sides in the tire circumferential direction and the cut depth of other sipes. The lateral sipes located on both end sides of the block in the tire circumferential direction are each configured to have a cut depth on the opening side shallower than at least one of the cut depth of a portion other than the opening of the lateral sipes located on both end sides in the tire circumferential direction and the cut depth of other sipes, so as to prevent the blocks from being excessively inclined, to thereby ensure the sufficient ground-contact area.

Here, in the present invention, the "opening" refers a portion of the lateral sipe opened to a main groove (or to a tread end) or to a lateral groove, and the "opening side" refers to an area falling within a range of 2 mm to 6 mm in the extending direction of the lateral sipe from the opening. Further, the "other sipes" refer to lateral sipes other than the lateral sipes located on both end sides of the block in the tire circumferential direction in the case where the block has three or more lateral sipes formed therein.

Effect of the Invention

According to the present invention, there can be provided a tire excellent in on-ice performance, in particular, on-ice braking performance, in which the ground-contact area of the tire can be ensured while simultaneously improving the scratch effect to be produced by the edges against an icy road, to thereby improve the on-ice friction properties of the tire.

BRIEF DESCRIPTION OF THE DRAWINGS

FIGS. 2 Explanatory views for illustrating a force acting on one block when the pneumatic tire of FIG. 1 is loaded with braking force, in which FIG. 2(a) is an explanatory view illustrating a case where the circumferential protrusion lies on the tread-in end-side of the block, and FIG. 2(b) is an explanatory view illustrating a case where the circumferential protrusion lies on the kick-out end-side of the block.

FIGS. 3 FIG. 3(a) is a development view illustrating part of a tread portion of another pneumatic tire according to the present invention, and FIG. 3(b) is a development view illustrating part of a tread portion of further another pneumatic tire according to the present invention.

FIGS. 4 FIGS. 4(a) to 4(d) are enlarged views illustrating modified examples of the blocks of the pneumatic tire according to the present invention.

FIGS. 5 FIG. 5(a) is a sectional view of the block of FIG. 4(d) taken along the line II-II, and FIG. 5(b) is a sectional view illustrating in section a modified example of the block shown in FIG. 4(d).

FIG. 6 FIG. 6(a) is an enlarged view illustrating another modified example of the block shown in FIG. 4(d), FIG. 6(b) is a sectional view of the block of FIG. 6(a) taken along the line III-III, FIG. 6(c) is a sectional view of the block of FIG. 6(a) taken along the line IV-IV, and FIG. 6(d) is a sectional view of the block of FIG. 6(a) taken along the line V-V.

FIGS. 8 FIGS. 8(a) to 8(d) are enlarged view illustrating other examples of the block of the pneumatic tire according to the present invention.

FIGS. 9 FIG. 9(a) is a sectional view of the block of FIG. 8(a) taken along the line VI-VI, FIG. 9(b) is a sectional view of the block of FIG. 8(a) taken along the line VII-VII, FIG. 9(c) is a sectional view of the block of FIG. 8(b) taken along the line VIII-VIII, and FIG. 9(d) is a sectional view of the block of FIG. 8(d) taken along the line IX-IX.

FIGS. 10 FIG. 10(a) is a development view illustrating part of a tread portion of another pneumatic tire according to the present invention, and FIG. 10(b) is a development view illustrating part of a tread portion of further another pneumatic tire according to the present invention.

FIGS. 11 FIG. 11(a) is a development view illustrating part of a tread portion of a conventional pneumatic tire, and FIG. 11(b) is a development view illustrating part of a tread portion of a pneumatic tire as a comparative example.

FIGS. 13 FIGS. 13(a) and 13(b) are explanatory diagrams for illustrating the relation between the inclination of the blocks and the ground-contact area of the tire in a conventional pneumatic tire.

BEST MODES FOR CARRYING OUT THE INVENTION

Figure 1:
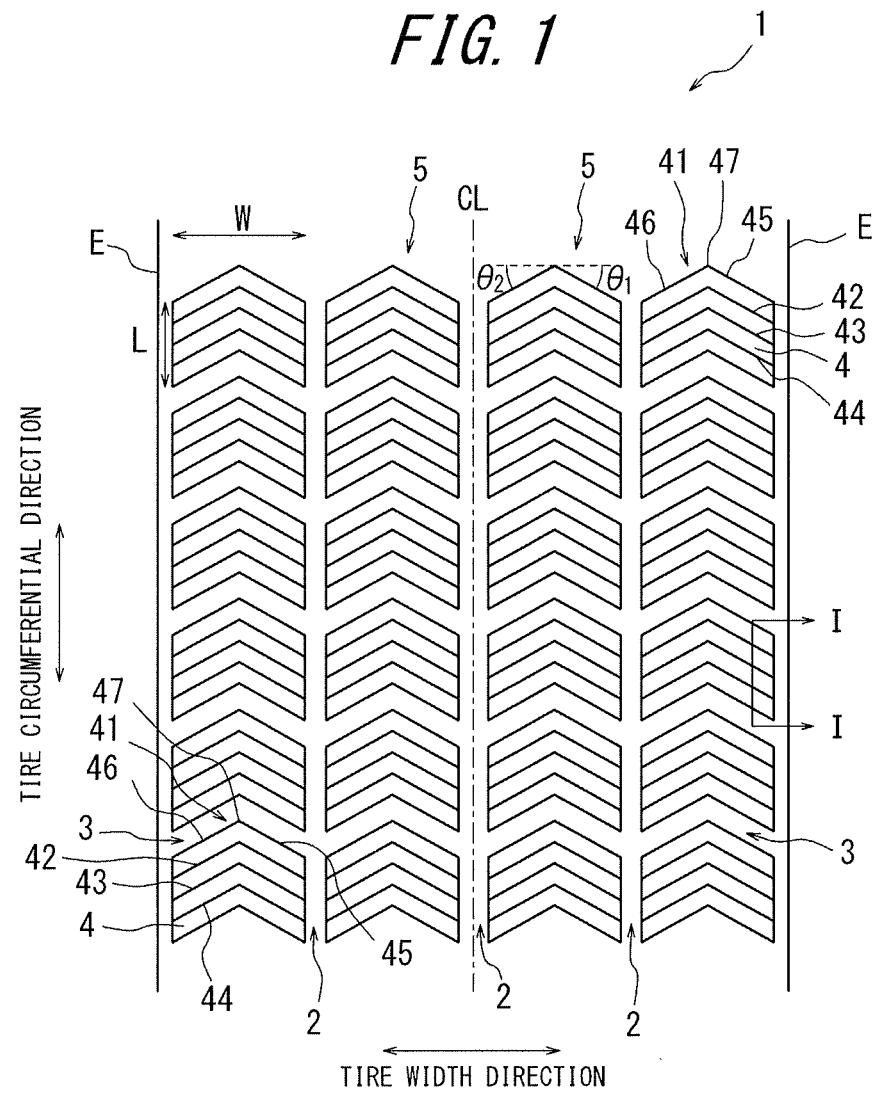
FIG. 1 A development view illustrating part of a tread portion of a pneumatic tire as a representative example according to the present invention.

In the following, embodiments of the present invention are described with reference to the drawings. FIG. 1 is a development view illustrating, as an example, part of a tread portion of a pneumatic tire of the present invention. The pneumatic tire of FIG. 1 has a plurality (three in FIG. 1) of main grooves 2 and a plurality of lateral grooves 3 arranged on a tread portion surface 1 located between tread ends E on both sides, the main grooves 2 linearly extending along the tire circumferential direction, the lateral grooves 3 extending in the tire width direction between the main grooves 2, 2 and between the main groove 2 and the tread end E, so that a plurality of blocks 4 are partition-formed. This exemplary pneumatic tire has four block land portion rows 5 arranged on the tread portion surface 1, the block land portion rows 5 each including a plurality of the blocks 4.

Here, the lateral grooves 3 each extend in the tire width direction having one bent point so as to be in a convex shape in the tire circumferential direction (upper direction in FIG. 1). In this exemplary pneumatic tire, the lateral grooves 3 are all bent in the same direction.

The blocks 4 are each in a shape conforming to the convex shape of the lateral groove partition-forming the block 4, preferably in the shape of an arrow feathers, and each have a circumferential protrusion 41. Further, the blocks 4 each has at least one (three in FIG. 1) of lateral sipes 42, 43, 44 arranged as extending in the tire width direction parallel to the lateral grooves 3. It should be noted that, in the pneumatic tire of the present invention, the lateral ripe is not necessarily limited to be in the same shape extending in the same direction as the lateral groove, and may be in any shape extending in any direction which may be different from those of the lateral grooves, without making the rigidity distribution inside the block excessively non-uniform.

The lateral sipes 42, 43, 44 are formed across the entire region in the tire width direction of each of the blocks 4. In other words, the lateral sipes 42, 43, 44 are open, at both end sides in the tire width direction, to the main grooves 2 located on both end sides of the block 4 in the tire width direction when the block 4 is formed between the main grooves 2, 2. Meanwhile, when the block 4 is formed between the main groove 2 and the tread end E, the lateral sipes 42, 43, 44 are open to the main groove 2 and the tread end E. Therefore, the lateral sipes 42, 43, 44 each have a dimension in the tire width direction in a projection view to be obtained when the sipes are projected onto the same plane which includes the tire rotation axis (not shown) and is perpendicular to the surface of the block 4, the dimension being equal to the dimension W in the tire width direction in a projection view which is obtained when the block 4 is projected onto the aforementioned plane. The groove width of the lateral sipes 42, 43, 44 (opening width of the lateral sipes) is not particularly limited, and may be set to 0.3 mm to 1.5 mm.

Here, in this exemplary pneumatic tire, when the circumferential protrusion 41 side of the block 4 serves as the tread-in end-side at the time of braking operation of the tire, as illustrated in an enlarged view of the block 4 of FIG. 2(a), a force acts in a direction (the direction indicated by the arrow of FIG. 2(a)) for causing wing portions, namely, both width ends of the arrow feathers shaped block 4, to be inclined toward the center (where an apex 47 is located). Therefore, the block 4 becomes insusceptible to inclination deformation, particularly at the center in the tire width direction, so that the ground-contact area of the tire can be ensured. Further, the wing portions (both end sides in the tire width direction) of the block 4 are subjected to a slight amount of inclination-deformation, which can improve the scratch effect to be produced by the edge of the block 4 against an icy road. Further, this exemplary pneumatic tire has lateral sipes 42, 43, 44 arranged across the entire region of the block 4 in the tire width direction, which can sufficiently ensure the edge component, to thereby improve the scratch effect to be produced by the edges of the lateral sipes 42, 43, 44 against a road surface.

Further, in this exemplary pneumatic tire, when a side opposite to the circumferential protrusion 41 side of the block 4 serves as the tread-in end-side at the time of braking operation of the tire, as illustrated in an enlarged view of the block 4 of FIG. 2(b), a force acts in a direction (the direction indicated by an arrow in FIG. 2(b)) for causing the wing portions of the block 4 having arrow feathers shape to open. Therefore, the wing portions (both end sides in the tire width direction) of the block 4 are subjected to a slight amount of inclination-deformation, which can improve the scratch effect to be produced by the edge of the block 4 against an icy road. Further, this exemplary pneumatic tire has lateral sipes 42, 43, 44 arranged across the entire region of the block 4 in the tire width direction, which can sufficiently ensure the edge component, to thereby improve the scratch effect to be produced by the edges of the lateral sipes 42, 43, 44 against a road surface.

Therefore, according to this exemplary pneumatic tire, the centre portion of the block in the tire width direction can ensure the ground-contact area, while the scratch effect against an icy road can be produced due to the arrangement of the lateral sipes, so that the ground-contact area of the tire can be ensured while simultaneously improving the scratch effect to be produced by the edge against an icy road, to thereby improve the on-ice friction properties of the tire.

Here, two side wall portions (first side wall portion 45, second side wall portion 46) forming side walls of the block 4 on the circumferential protrusion 41 side, may preferably be installed toward the apex 47 of the circumferential protrusion 41 at installation angles $\theta_1$, $\theta_2$ each falling within a range of 15° to 45° relative to the tire width direction. When the installation angles $\theta_1$, $\theta_2$ are each smaller than 15°, there is a fear that the effect illustrated in FIG. 2(a) may not be obtained even though the edge component in the tire width direction can be ensured. Meanwhile, when the installation angles $\theta_1$, $\theta_2$ are each lager than 45°, the blocks are reduced in rigidity in the tire width direction so as to undergo a larger twist deformation, which leads to a fear of losing a considerable amount of the ground-contact area. Here, the installation angles $\theta_1$, $\theta_2$ of the side wall portions 45, 46 may be different from each other. However, the installation angles $\theta_1$, $\theta_2$ may preferably be equal to each other ($\theta_1 = \theta_2$) in view of ensuring both the ground-contact area of the tire and the improvement in scratch effect to be produced by the edges against an icy road in a balanced manner.

Further, the blocks 4 each have a tire-circumferential-direction dimension L (the dimension of a longest portion of the block in the tire circumferential direction) which is preferably smaller than a tire-width-direction dimension W of each of the blocks 4 (the dimension of a longest portion of the block in the tire width direction). As described above, when the tire-circumferential-direction dimension L is smaller than the tire-width-direction dimension W (L<W), the blocks 4 can be increased in length across both edges in the tire circumferential direction and also increased in length of the lateral sipes, as compared to a case where the tire-circumferential-direction dimension L is larger than the tire-width-direction dimension W, so that the scratch effect to be produced by the edges of the blocks 4 and the lateral sipes 42, 43, 44 against an icy road can be improved while simultaneously improving the scratch effect to be produced by the edges of the blocks against icy road by allowing the blocks to be inclined as appropriate. In view of further improving the scratch effect to be produced by the edges of the blocks 4 against a road surface, W may preferably be 1.1 to 2.5 times larger than L.

Further, the blocks 4 each preferably have 0.16 to 0.40 lateral sipes 42, 43, 44 per unit length (1 mm) of the block 4 in the tire circumferential direction. The reason is as follows. When the lying density of the lateral sipes is less than 0.16/mm, there is a fear that the sufficient scratch effect to be produced by the edges against an icy road cannot be obtained.

In contrast, when the lying density of the lateral sipes is more than 0.40/mm, the block is reduced in rigidity which makes the block easy to be inclined, leading to a fear of losing the ground-contact area.

The three lateral sipes 42, 43, 44 formed in each of the blocks 4 each preferably have a cut depth as follows. That is, the two lateral sipes 42 and 44 disposed on both end sides of the block 4 in the tire circumferential direction each have a cut depth on the opening side (which is in a range of 2 mm to 6 mm in the extending direction of the lateral sipe from a portion where the sipe opens to the main groove 2) which is shallower than the cut depths of the lateral sipes 42, 44 excluding the opening sides thereof and the cut depth of the lateral sipe 43 disposed in the center of the block 4. As described above, when the cut depths of the opening side of the lateral sipes 42, 44 disposed on both end sides of the block 4 in the tire circumferential direction are formed shallower than the cut depths of the lateral sipes 42, 44 excluding the opening sides thereof and the cut depth of the other lateral sipe 43, the blocks 4 can be suppressed from being deformed at both end sides in the tire circumferential direction, which are otherwise susceptible to deformation due to an input from a road surface, to thereby make it possible to ensure both the ground-contact area of the tire and the improvement in scratch effect to be produced by the edges against an icy road in a balanced manner. Here, in view of suppressing deformation of the block 4 at both end sides in the tire circumferential direction, the cut depths of the entire lateral sipes 42, 44 may be formed shallower than the cut depth of the lateral sipe 43, as long as at least the cut depth on the opening side of each of the lateral sipes 42, 44 is shallower than the cut depth of the other lateral sipe 43.

In the aforementioned exemplary pneumatic tire, all the blocks 4 are arrange in the same direction. However, the arrangement direction of the blocks 4 is not particularly limited in the pneumatic tire of the present invention. Specifically, the pneumatic tire of the present invention may have the blocks 4 arranged in different directions for each block land portion row 5 as illustrated in, for example, FIGS. 3(a) and 3(b). Alternatively, the pneumatic tire of the present invention may have the blocks 4 arranged in different directions within each block land portion row 5.

FIG. 3(a) illustrates an example of another pneumatic tire of the present invention. The pneumatic tire of FIG. 3(a) includes, on the tread portion surface 1A, two block land portion rows 5c, 5d and two block land portion rows 5a, 5b, across a tire equator CL therebetween, the block land portion rows 5c, 5d having the blocks 4 arranged with the circumferential protrusions 41 thereof being located on the upper side in FIG. 3(a), the block land portion rows 5a, 5b having the blocks 4 arranged with the circumferential protrusions 41 being located on the lower side in FIG. 3(a). Here, the blocks 4 of this exemplary pneumatic tire are configured similarly to those of the blocks 4 of the pneumatic tire of the foregoing example.

FIG. 3(b) illustrates an example of further another pneumatic tire of the present invention. The pneumatic tire of FIG. 3(b) includes, on the tread portion surface 1B, block land portion rows 5b', 5d' having the blocks 4 arranged with the circumferential protrusions 41 being located on the upper side in FIG. 3(b), and the block land portion rows 5a', 5c' having the blocks 4 arranged with the circumferential protrusions 41 being located on the lower side in FIG. 3(b), the block land portion rows 5b', 5d' each being arranged alternately with each of the block land portion rows 5a', 5c'. Here, the blocks 4 of this exemplary pneumatic tire are configured similarly to those of the blocks 4 of the pneumatic tire of the foregoing example.

Further, the pneumatic tires illustrated in FIGS. 3(a) and 3(b) are capable of being improved in on-ice friction properties in a balanced manner, irrespective of the rotation direction of the tire. Here, the pneumatic tire of the present invention is also capable of being improved in on-ice friction properties in a balanced manner, irrespective of the rotation direction of the tire, even if the blocks are arranged in different directions within the same block land portion row.

Further, in the pneumatic tire of the present invention, the blocks and the sipes can be arbitrarily changed in shape thereof as appropriate. Specifically, for example, as illustrated in FIGS. 4(a), 4(c), and 4(d), the blocks may be arranged so as to have the apexes thereof offset in position, and as illustrated in FIGS. 4(b) to 4(d), the lateral sipe may be configured as a combined sipe formed of a pair of sipes or may be configured as a so-called three-dimensional sipe.

Figure 2:
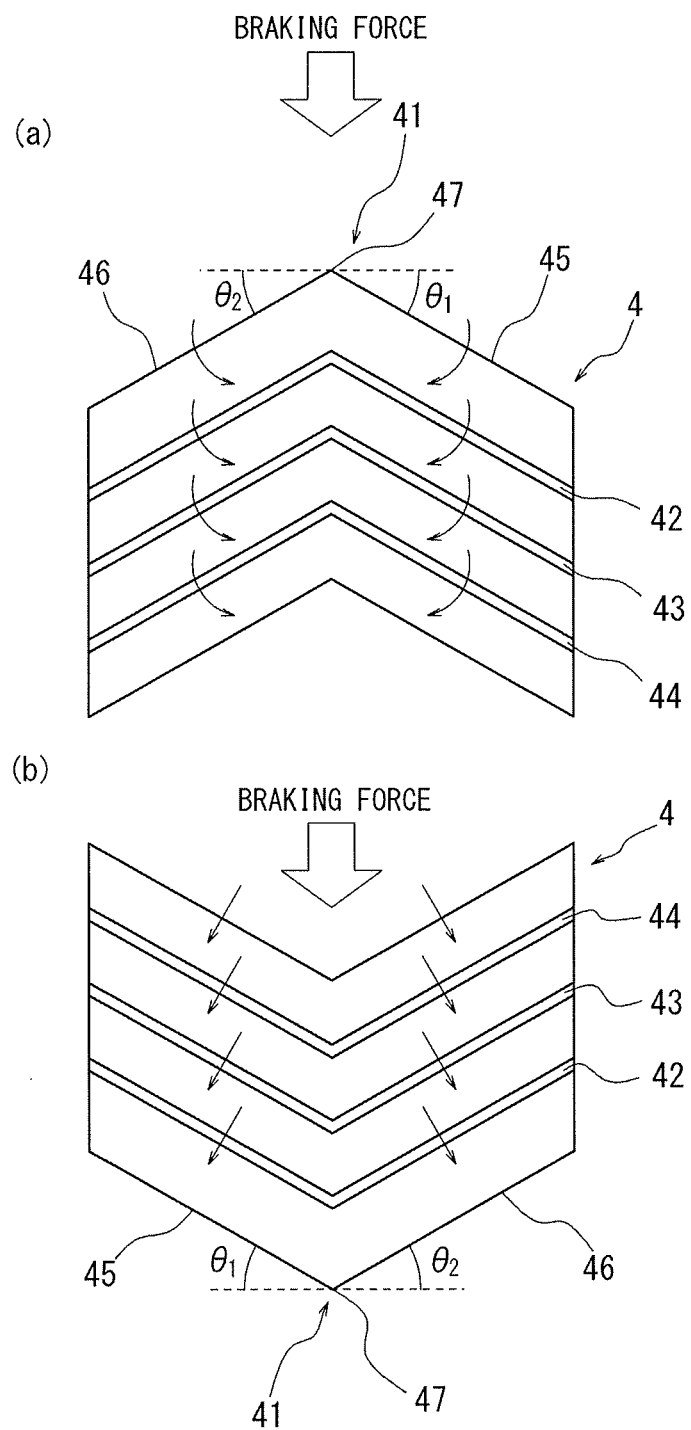
Figure 3:
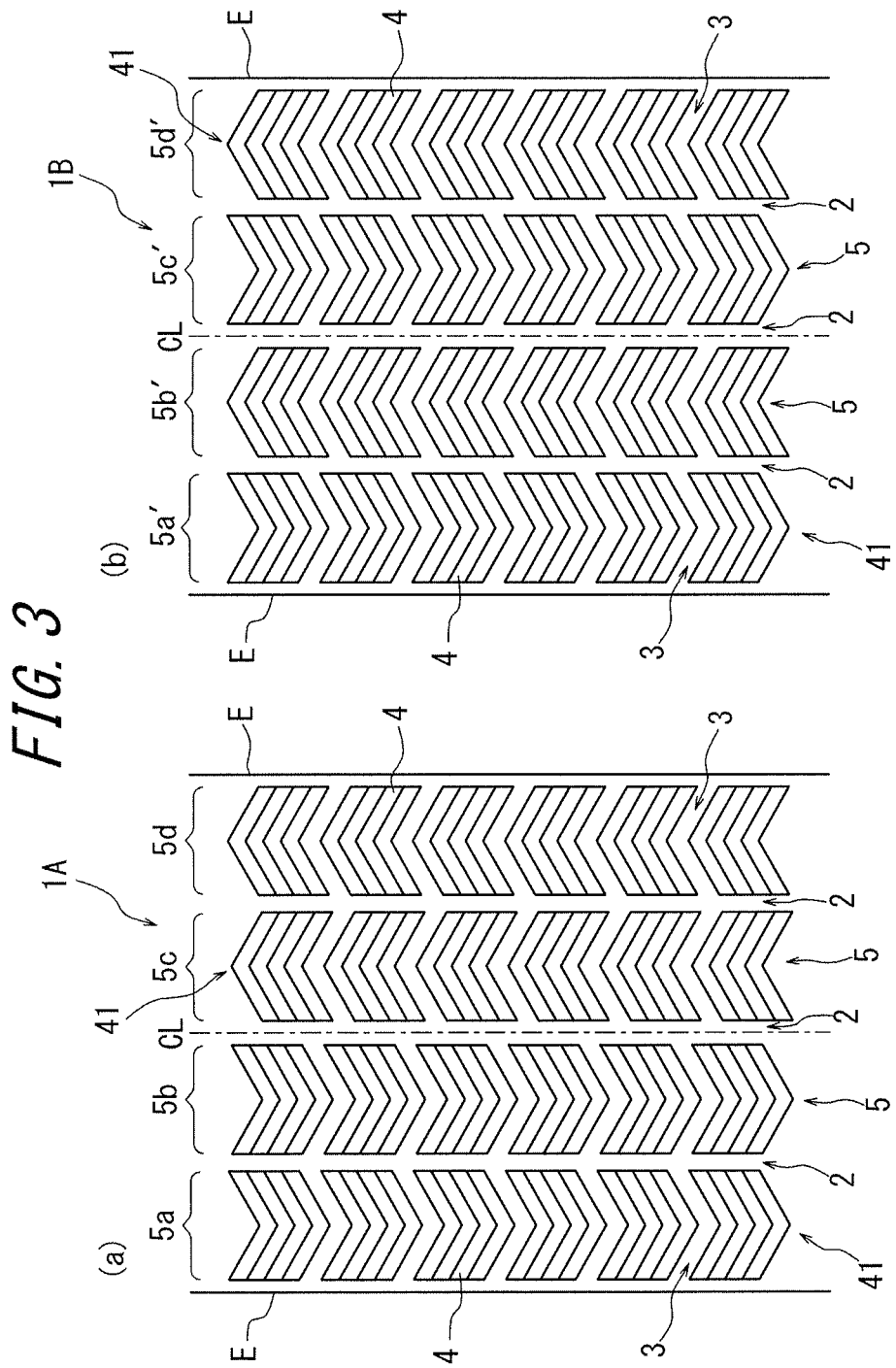
Figure 4:
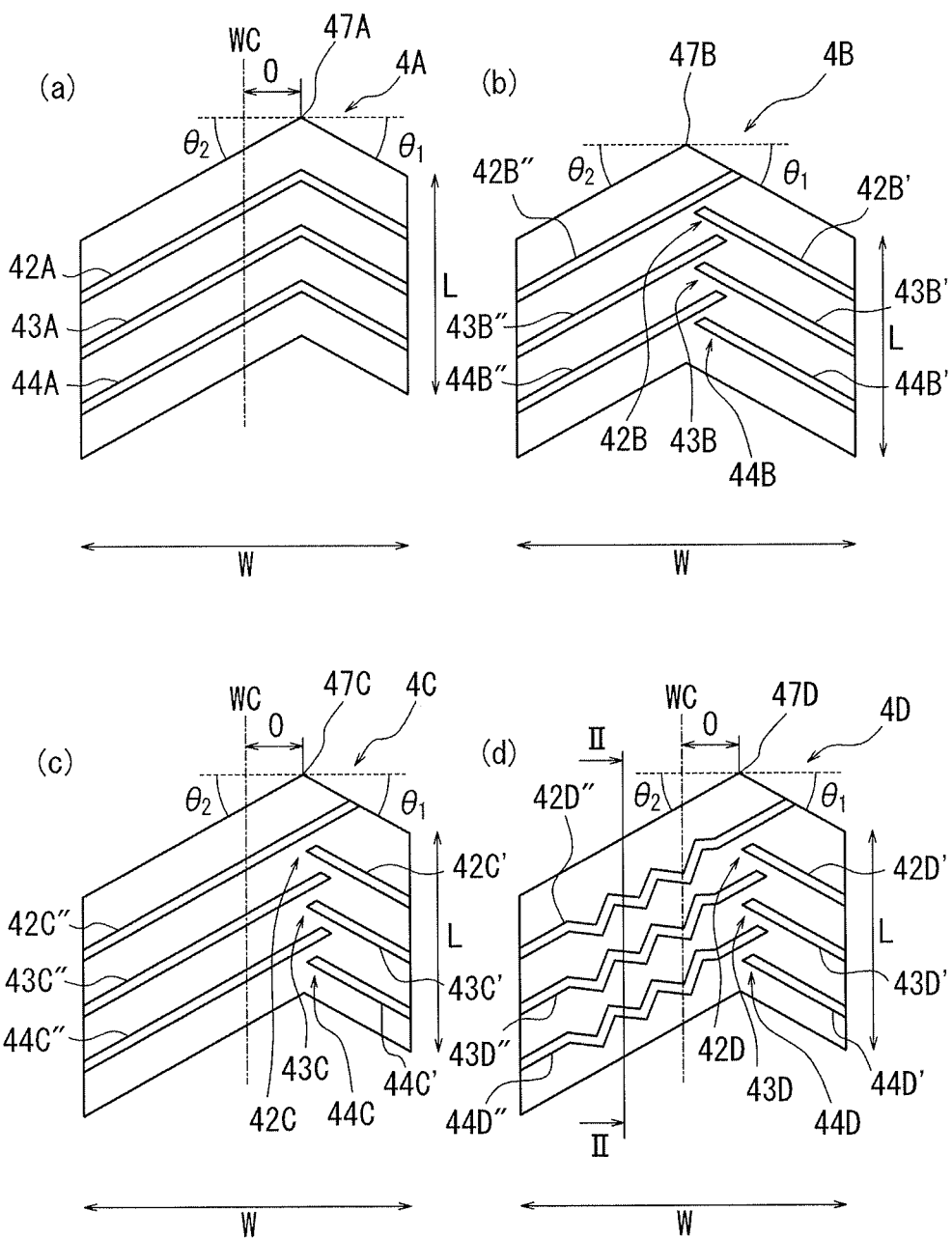

Here, a block 4A illustrated in FIG. 4(a) is similar in configuration to the block 4 of FIGS. 1 to 3, except in that an apex 47A of a circumferential protrusion of the block 4A is disposed offset to the right in FIG. 4(a) by a distance O from the width center line WC of the block 4A. Here, in the pneumatic tire of the present invention, the direction in which the apex is offset is not particularly limited, and the apex 47A may be offset in a direction opposite to that of FIG. 4(a).

Then, in the pneumatic tire having the blocks 4A disposed on the tread portion surface, the portion where the apex 47A of each of the blocks 4A is located becomes insusceptible to inclination-deformation, similarly to the aforementioned pneumatic tire having the blocks 4 disposed on the tread portion surface, to thereby ensure the ground-contact area of the tire. Further, in the pneumatic tire having the blocks 4A disposed on the tread portion surface, the scratch effect to be produced by the edges against a road surface can further be increased particularly in the longer wing portion (region located on the width center line WC side relative to the apex 47A) of the block 4A. As a result, the scratch effect to be produced by the edges of the blocks 4A and the edges of the lateral sipes 42A, 43A, 44A against a road surface can be effectively improved. Therefore, the ground-contact area of the tire can be ensured while simultaneously improving the scratch effect to be produced by the edges against an icy road, to thereby improve the on-ice friction performance of the tire.

The distance O by which the apex 47A is offset from the width center line WC of the block 4A may preferably be 10% to 30% of the block width W. When the distance O of the offset is less than 10% of the block width W (O<0.1 W), there is a fear that the scratch effect to be produced by the edge of the longer wing portion side against a road surface become insufficient. On the other hand, when the distance O of the offset exceeds 30% of the block width W (O>0.3 W), there is a fear that the block 4A become susceptible to inclination-deformation, making it difficult to ensure the ground-contact area.

A block 4B illustrated in FIG. 4(b) are similar in configuration to the block 4 illustrated in each of FIGS. 1 to 3, except for the following points. That is, the block 4B includes, as lateral sipes, combined lateral sipes 42B, 43B, 44B having first sipes 42B', 43B', 44B' which are each open, at one end thereof, to a main groove on the right side in FIG. 4(b) while terminating, at the other end thereof, within the block, and second sipes 42B", 43B", 44B" which are each open, at one end thereof, to another main groove (main groove on the left side in FIG. 4(b)) while terminating, at the other end thereof, within the block, in which the first sipes 42B', 43B', 44B' of the combined sipes 42B, 43B, 44B each have a tire-width-direction dimensional component overlapping with a tire-width-direction dimensional component of each of the second sipes 42B", 43B", 44B" in a projection view obtained by projecting the combined lateral sipes 42B, 43B, 44B onto the same plane which includes the tire rotation axis and is perpendicular to the block surface. Here, in the block 4B, the sipe located closest to the apex 47B side in the tire circumferential direction opens, at one end thereof, to the main groove on the left side in FIG. 4(b) while opening to the lateral groove at the other end thereof. However, in the pneumatic tire according to the present invention, the other end of the sipe located closest to the apex 47B side in the tire circumferential direction may terminate within the block.

Then, in the pneumatic tire having the blocks 4B disposed on the tread portion surface, the center portion (portion where the apex 47B is located) of each of the blocks 4B becomes insusceptible to inclination-deformation, similarly to the case of the aforementioned pneumatic tire having the blocks 4 disposed on the tread portion surface, to thereby ensure the ground-contact area of the tire. Further, in the pneumatic tire having the blocks 4B arranged on the tread portion surface, the edge component is increased in particular at the center portion of the block 4B, and hence the scratch effect to be produced by the edges against a road surface can further be increased, to thereby effectively improve the scratch effect to be produced by the edges of the blocks 4B and the combined lateral sipes 42B, 43B, 44B against a road surface. Therefore, the ground-contact area of the tire can be ensured while simultaneously improving the scratch effect to be produced by the edge against an icy road, to thereby improve the on-ice friction properties of the tire.

Here, the overlapping length between the first sipes 42B', 43B', 44B' and the second sipes 42B", 43B", 44B", that is, the overlapping length of the tire width direction dimensional components in the projection view of both of the sipes, may be defined as a maximum length that can allow the combined lateral sipes 42B, 43B, 44B to be disposed at a lying density of 0.16 to 0.40/mm without coming into contact with other lateral sipes. The maximum overlapping length thus defined makes it possible to sufficiently ensure the edge component.

A block 4C illustrated in FIG. 4(c) are similar in configuration to the block 4A illustrated in FIG. 4(a), except for the following points. That is, the block 4C includes, as lateral sipes, combined lateral sipes 42C, 43C, 44C having first sipes 42C', 43C', 44C' which are each open, at one end thereof, to a main groove on the right side in FIG. 4(c) while terminating, at the other end thereof, within the block, and second sipes 42C", 43C", 44C" which are each open, at one end thereof, to another main groove (main groove on the left side in FIG. 4(c)) while terminating, at the other end thereof, within the block, in which the first sipes 42C', 43C', 44C' of the combined sipes 42C, 43C, 44C each have a tire width direction dimensional component overlapping with a tire width direction dimensional component of each of the second sipes 42C", 43C", 44C" in a projection view obtained by projecting the combined lateral sipes 42C, 43C, 44C onto the same plane which includes the tire rotation axis and is perpendicular to the block surface. Here, in the block 4C, the sipe located closest to the apex 47C side in the tire circumferential direction opens, at one end thereof, to the main groove on the left side in FIG. 4(c) while opening to the lateral groove at the other end thereof. However, in the pneumatic tire according to the present invention, the other end of the sipe located closest to the apex 47C side in the tire circumferential direction may terminate within the block.

Then, in the pneumatic tire having the blocks 4C disposed on the tread portion surface, a portion where the apex 47C of each of the blocks 4C is located becomes insusceptible to inclination-deformation, similarly to the case of the aforementioned pneumatic tire having the blocks 4A disposed on the tread portion surface, to thereby ensure the ground-contact area of the tire. Further, the scratch effect to be produced by the edges against a road surface can further be increased particularly in the longer wing portion of the block 4C (region on the width center line WC side relative to the apex 47C). Still further, in the pneumatic tire having the blocks 4C disposed on the tread portion surface, the edge component is increased particularly in a portion where the apex 47C of the block 4C is located, similarly to the pneumatic tire having the blocks 4B disposed on the tread portion surface, which can further increase the scratch effect to be produced by the edges against a road surface. Therefore, the ground-contact area of the tire can be ensured while simultaneously improving the scratch effect to be produced by the edge against an icy road, to thereby improve the on-ice friction properties of the tire.

As in the case of the block 4A, the distance O by which the apex 47C is offset from the width center line WC of the block 4C may preferably be 10% to 30% of the block width W. Further, as in the case of block 4B, the overlapping length between the first sipes 42C', 43C', 44C' and the second sipes 42C", 43C", 44C", that is, the overlapping length of the tire width direction dimensional components in the projection view of both of the sipes, may be defined as a maximum length that can allow the combined lateral sipes 42C, 43C, 44C to be disposed at a lying density of 0.16 to 0.40/mm without coming into contact with other lateral sipes.

A block 4D illustrated in FIG. 4(d) are similar in configuration to the block 4C illustrated in FIG. 4(c), except for the following points. That is, first sipes 42D', 43D', 44D' serving as first sipe components opening at one ends thereof to a main groove located on an apex 47D side relative to the width center line WC of the block 4D are linearly shaped in both the extending direction and the depth direction while second sipes 42D", 43D", 44D" serving as second sipe components opening at one ends thereof to another main groove are three-dimensionally formed so as to be bent in both the extending direction and the depth direction as illustrated in section in FIG. 5(a) which taken along the line II-II of FIG. 4(d). Here, the three-dimensionally formed sipe which is bent in both the extending direction and the depth direction may employ, for example, a sipe disclosed in JP 2000-6619 A. Here, in the block 4D, the sipe located closest to the apex 47D side in the tire circumferential direction opens, at one end thereof, to the main groove on the left side in FIG. 4(d) while opening to the lateral groove at the other end thereof. However, in the pneumatic tire according to the present invention, the other end of the sipe located closest to the apex 47D side in the tire circumferential direction may terminate within the block.

Then, in the pneumatic tire having the blocks 4D disposed on the tread portion surface, a portion where the apex 47D of each of the blocks 4D is located becomes insusceptible to inclination-deformation, similarly to the aforementioned pneumatic tire having the block 4C disposed on the tread portion surface, to thereby ensure the ground-contact area of the tire. Further, the scratch effect to be produced by the edges against a road surface can further be increased particularly in the longer wing portion of the block 4D (region on the width center line WC side relative to the apex 47D) and in a portion where the apex 47D is located. Still further, the second sipes 42D", 43D", 44D" arranged in the longer wing portion of the block 4D are each configured as a so-called three dimensional sipe, which prevents the rigidity of the wing portion from being excessively reduced, so that both the sufficient ground-contact area and the scratch effect to be produced by the edges against an icy road can be more effectively attained. Therefore, the ground-contact area of the tire can be ensured while simultaneously improving the scratch effect to be produced by the edges against an icy road, to thereby improve the on-ice friction performance of the tire.

As in the case of the block 4C, the distance O by which the apex 47D is offset from the width center line WC of the block 4D may preferably be 10% to 30% of the block width W. Further, as in the case of block 4C, the overlapping length between the first sipes 42D', 43D', 44D' and the second sipes 42D", 43D", 44D", that is, the overlapping length of the tire width direction dimensional components in the projection view of both of the sipes, may be defined as a maximum length that can allow the combined lateral sipes 42D, 43D, 44D to be disposed at a lying density of 0.16 to 0.40/mm without coming into contact with other lateral sipes. In this regard, in view of adjusting the rigidity of the block 4D, the cut depths of the second sipes 42D", 43D", 44D" of the block 4D may be defined as illustrated in FIG. 5(b) such that the cut depth of the second sipe 43D" located at the center of the block becomes deeper than the cut depths of the second sipes 42D", 44D" located on both end sides of the block in the tire circumferential direction.

In view of adjusting the rigidity of the blocks so as to prevent the blocks from being inclined excessively to thereby sufficiently ensure the ground-contact area, the second sipes 42D", 43D", 44D" of the block may preferably be provided with slit portions S which are shallow in cut depth, as in a block 4D' illustrated in FIG. 6(a). Further, the opening sides of the lateral sipes (the first sipes 42D', 44D' and the second sipes 42D", 44D") located on both end sides of the block in the tire circumferential direction may preferably be provided with a raised-bottom portion R, which is shallower in cut depth as compared to the cut depth of the second sipe 43D" located in the center of the block. In the block 4D', which is shown in section in FIG. 6(b) taken along the line of FIG. 6(a), shown in section in FIG. 6(c) taken along the line IV-IV of FIG. 6(a), and shown in section in FIG. 6(d) taken along the line V-V of FIG. 6(a), the slit portion S and the raised-bottom portion R of the combined lateral sipes 42D-44D are configured shallow in depth. Therefore, the blocks can be prevented from being significantly reduced in rigidity, to thereby prevent the blocks from being excessively inclined, so that the ground-contact area can be ensured sufficiently. Here, a single block may include both the slit portion S and the raised-bottom portion R as illustrated in FIG. 6(a), or may include only one of the slit portion S and the raised-bottom portion R.

Further, in the pneumatic tire of the present invention, the sipes of the blocks 4 illustrated in FIGS. 1 to 3 may be changed in shape. Specifically, at least three (three in FIG. 1) lateral sipes 42, 43, 44 extending, parallel to the lateral grooves 3, in the tire width direction may be formed in shapes as illustrated in section of FIG. 7 which is taken along the line I-I of FIG. 1.

Figure 7:
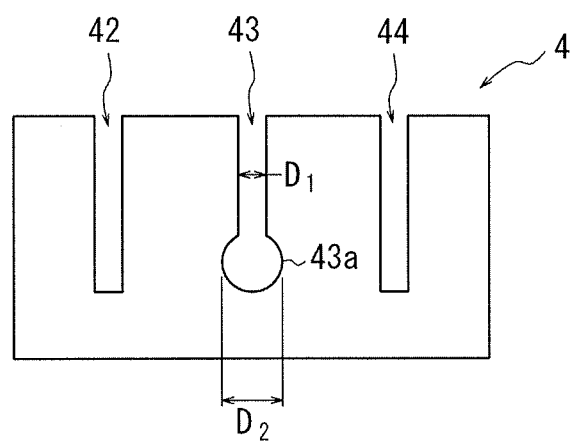
FIG. 7 A view illustrating, in section, a modified example of the block of the pneumatic tire shown in FIG. 1, taken along the line I-I of FIG. 1.

Here, as illustrated in FIG. 7, the lateral sipes 42, 44 (which may also be referred to as "circumferential end side lateral sipes" hereinafter) located on both end sides in the tire circumferential direction of the block 4 as a modified example each have a width in the tire circumferential direction which is uniform in the depth direction. Further, one lateral sipe 43 (which may also be referred to as "center side lateral sipe" hereinafter) located between the circumferential end side lateral sipes 42, 44 is a bottom-enlarged sipe having an enlarged portion 43a (having a width $D_2$ in the tire circumferential direction) which is substantially circular in shape in cross section having a width in the tire circumferential direction larger than the opening width $D_1$ of the lateral sipe 43 on the tread portion surface 1. According to the pneumatic tire of the present invention, the bottom-enlarged sipe may be in any size and shape. The bottom-enlarged sipe is not specifically limited, and may employ, for example, a flask sipe disclosed in JP 2009-166762 A.

Then, in the pneumatic tire of the modified example which has the blocks 4 disposed on the tread portion surface, the blocks 4 each including the center side lateral sipe 43 configured as a bottom-enlarged sipe 43, a portion where the apex 47 of each of the blocks 4 is located becomes insusceptible to inclination-deformation, similarly to the aforementioned pneumatic tire illustrated in FIGS. 1 to 3, to thereby ensure the ground-contact area of the tire. Further, in the pneumatic tire of the modified example, the center side lateral sipe 43 is configured as a bottom-enlarged sipe having an enlarged portion 43a at the bottom of the sipe so as to be high in drainage performance, so that a water film to be generated between a road surface and the tire can be effectively removed to thereby ensure a sufficient grip of the tire. Therefore, the ground-contact area of the tire can be ensured while simultaneously improving the scratch effect to be produced by the edges against an icy road and the water film removing effect produced by the sipe, to thereby improve the on-ice friction performance of the tire.

In general, a bottom-enlarged sipe formed in a block reduces the rigidity of the block, making the block susceptible to inclination-deformation. In the pneumatic tire of the modified example, however, the center side lateral sipe 43, other than the circumferential end side lateral sipes 42, 44 located at both end sides in the tire circumferential direction of the block 4, is formed as a bottom-enlarged sipe, which prevents significant reduction in rigidity at both end sides of the block 4 in the tire circumferential direction, with the result that the block can be prevented from being subjected to excessive inclination-deformation.

Meanwhile, in the pneumatic tire of the present invention, in the case of providing four or more lateral sipes in the block, at least one of the lateral sipes located between the lateral sipes located on both end sides of the block in the tire circumferential direction (that is, the lateral sipes other than the circumferential end side lateral sipes) may preferably be formed as a bottom-enlarged sipe.

Further, in the aforementioned pneumatic tire having a block which includes the center side lateral sipe formed as a bottom-enlarged sipe, the blocks and the sipes may be arbitrarily changed in shape as appropriate. Specifically, as illustrated in FIGS. 8(a) to 8(d), the position of the apex of the block may be offset, and the lateral sipe may be configured as a combined lateral sipe including a pair of sipes. Further, as illustrated in FIGS. 8(b) to 8(d), at least a part of the lateral sipe may be configured as a so-called three-dimensional sipe.

Figure 8:
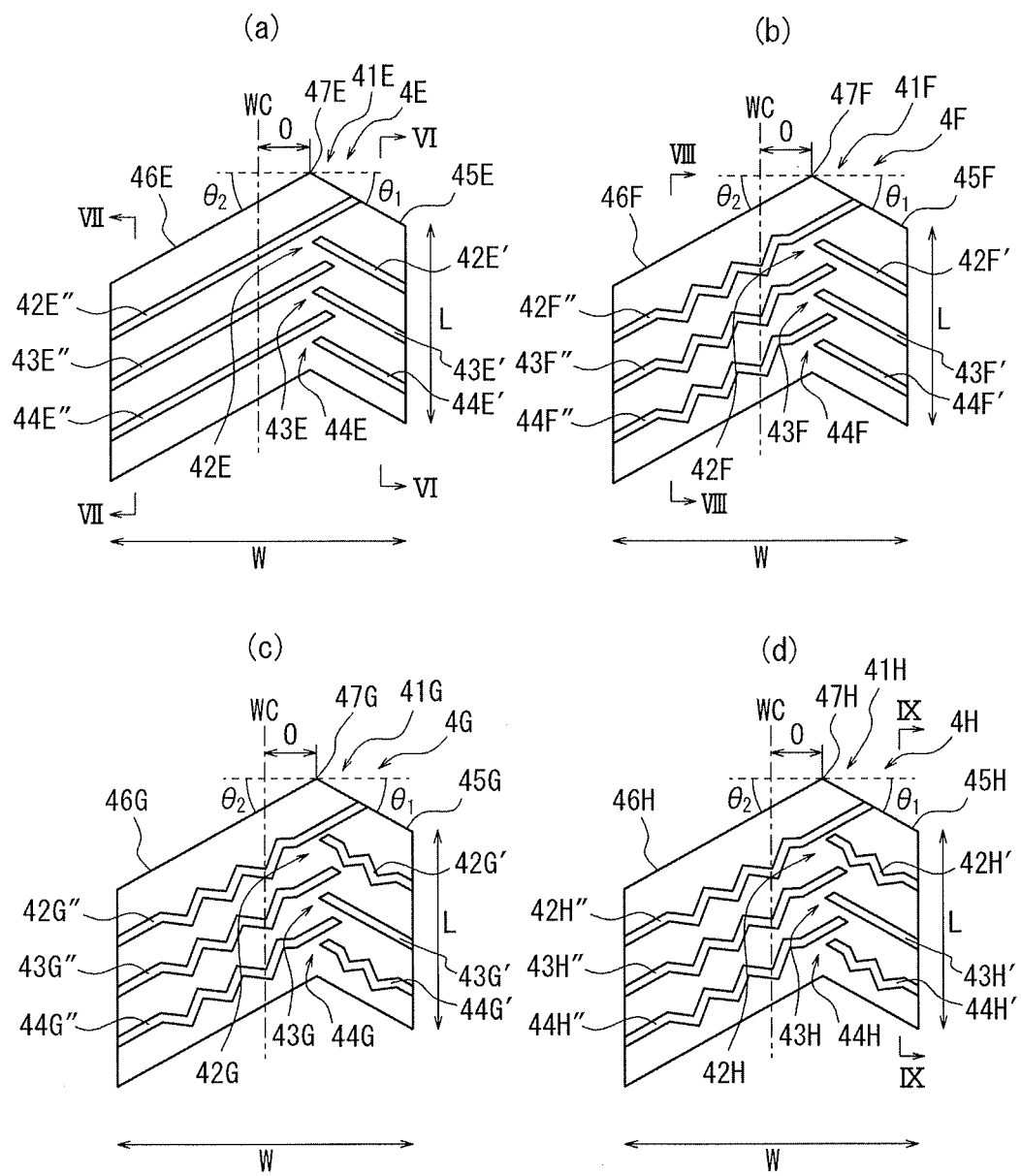

Here, a block 4E illustrated in FIG. 8(a) is different in shape from the block 4 illustrated in FIGS. 1 to 3, in that an apex 47E of a circumferential protrusion 41E of the block 4E is disposed as being offset to the right in FIG. 8(a) by a distance O from the width center line WC of the block 4E. Further, in the block 4E, a circumferential end side lateral sipe 42E located on an apex 47E side (upper side in FIG. 8(a)) is formed of a combined lateral sipe including a first sipe 42E' opening, at one end thereof, to a main groove on the right in FIG. 8(a) while terminating, at the other end thereof, within the block, and a second sipe 42E" opening, at one end thereof, to the other main groove (main groove on the left in FIG. 8(a)) while opening, at the other end thereof, to a lateral groove on the upper side in FIG. 8(a). Further, in the block 4E, a center side lateral sipe 43E is formed of a combined lateral sipe including a first sipe 43E' and a second sipe 43E", and a circumferential end side lateral sipe 44E located on the opposite side to the apex 47E in the tire circumferential direction is formed of a combined lateral sipe including a first sipe 44E' and a second sipe 44E", the first sipes 43E', 44E' each opening, at one end thereof, to a main groove on the right in FIG. 8(*a*) while terminating, at the other end thereof, within the block, the second sipes 43E", 44E" each opening, at one end thereof, to the other main groove (main groove on the left in FIG. 8(*a*)) while terminating, at the other end thereof, within the block. Here, in the pneumatic tire of the present invention, the direction in which the apex 47E is offset is not specifically limited, and the apex 47E may be offset in a direction opposite to that of FIG. 8(*a*). Further, the second sipe 42E" located closest to the apex 47E side in the tire circumferential direction may be terminated, at the other end thereof, within the block.

Then, in the block 4E, the first sipes 42E', 43E', 44E' each have a tire width direction dimensional component overlapping with a tire width direction dimensional component of each of the second sipes 42E", 43E", 44E" in a projection view obtained by projecting the lateral sipes 42E, 43E, 44E onto the same plane which includes the tire rotation axis and is perpendicular to the block surface.

Further, in the block 4E, the first sipes 42E', 43E', 44E' and the second sipes 42E", 43E", 44E" are so-called two-dimensional sipes linearly extending both in the extending direction and the depth direction, as illustrated in section in FIG. 9(*a*) taken along the line VI-VI of FIG. 8(*a*) and in section in FIG. 9(*b*) taken along the line VII-VII of FIG. 8(*a*). Then, the first sipe 43E' forming the center side lateral sipe 43E located between the circumferential end side lateral sipes 42E, 44E of the block 4E is a bottom-enlarged sipe having an enlarged portion 43*a* at the bottom thereof. In other words, in the block 4E, part of the bottom of the center side lateral sipe 43E (first sipe 43E') is provided with the enlarged portion 43*a*. In the pneumatic tire of the present invention, the second sipe 43E" forming the center side lateral sipe 43E may also be formed as a bottom-enlarged sipe.

Then, in the pneumatic tire having the blocks 4E disposed on the tread portion surface, the portion where the apex 47E of each of the blocks 4E is located becomes insusceptible to inclination-deformation, similarly to the aforementioned pneumatic tire having the blocks 4 disposed on the tread portion surface, to thereby ensure the ground-contact area of the tire. Further, in the pneumatic tire having the blocks 4E disposed on the tread portion surface, the scratch effect to be produced by the edges against a road surface can further be increased particularly in the longer wing portion (region located on the width center line WC side relative to the apex 47E) of the block 4E, to thereby effectively improve the scratch effect to be produced by the edge of the block 4E and the edges of the lateral sipes 42E, 43E, 44E against a road surface. Still further, in the pneumatic tire having the blocks 4E disposed on the tread portion surface, the edge component is increased in particular at the center portion of the block 4E, so that the scratch effect to be produced by the edges against a road surface can further be increased. As a result, the scratch effect to be produced by the edges of the blocks 4E and the edges of the lateral sipes 42E, 43E, 44E against a road surface can be effectively improved. Therefore, the ground-contact area of the tire can be ensured while simultaneously improving the scratch effect to be produced by the edge against an icy road, to thereby improve the on-ice friction properties of the tire.

Further, in the pneumatic tire having the blocks 4E disposed on the tread portion surface, the first sipe 43E' forming the center side lateral sipe 43E is configured as a bottom-enlarged sipe having an enlarged portion 43*a* at the bottom of the sipe so as to be high in drainage performance, so that a water film to be generated between a road surface and the tire can be effectively removed to thereby ensure a sufficient grip of the tire.

The distance O by which the apex 47E is offset from the width center line WC of the block 4E may preferably be 10% to 30% of the block width W. When the distance O of the offset is less than 10% of the block width W (O<0.1 W), there is a fear that the scratch effect to be produced by the edge of the longer wing portion side against a road surface becomes insufficient. On the other hand, when the distance O of the offset exceeds 30% of the block width W (O>0.3 W), there is a fear that the block 4E become susceptible to inclination-deformation, making it difficult to ensure the ground-contact area.

Here, the overlapping length between the first sipes 42E', 43E', 44E' and the second sipes 42E", 43E", 44E", that is, the overlapping length of the tire width direction dimensional components in the projection view of both of the sipes, may be defined as a maximum length that can allow the lateral sipes to be disposed at a lying density of 0.16 to 0.40/mm without coming into contact with other lateral sipes. The maximum overlapping length thus defined makes it possible to sufficiently ensure the edge component.

Here, in the block 4E, similarly to the block 4 illustrated in FIGS. 1 to 3, two side wall portions (first side wall portion 45E, second side wall portion 46E) forming walls of the block 4E on the circumferential protrusion 41E side, may preferably be installed at installation angles $\theta_1$, $\theta_2$ each falling within a range of 15° to 45° relative to the tire width direction. Further, the blocks 4E each have a tire-circumferential-direction dimension L which is preferably smaller than a tire-width-direction dimension W of each of the blocks 4E, and it is further preferred that W is 1.1 to 2.5 times larger than L. Further, the two circumferential end side lateral sipes 42E and 44E located on both end sides of the block 4E in the tire circumferential direction each have a cut depth on the opening side, which is preferably shallower than the cut depths of the circumferential end side lateral sipes 42E, 44E excluding the opening sides thereof and the cut depth of the center side lateral sipe 43E.

The block 4F illustrated in FIG. 8(*b*) is similar in configuration to the block 4A of FIG. 8(*a*), except for the following points. That is, first sipes 42F', 43F', 44F' serving as first sipe components opening at one ends thereof to a main groove located on an apex 47F side relative to the width center line WC of the block 4F are linearly shaped in both the extending direction and the depth direction while second sipes 42F", 43F", 44F" serving as second sipe components opening at one ends thereof to another main groove are three-dimensionally formed so as to be bent in both the extending direction and the depth direction as illustrated in section in FIG. 9(*c*) which taken along the line VIII-VIII of FIG. 8(*b*). Here, the three-dimensionally formed sipe which is bent in both the extending direction and the depth direction may employ, for example, a sipe disclosed in JP 2000-6619 A.

Then, in the pneumatic tire having the blocks 4F disposed on the tread portion surface, the portion where the apex 47F of each of the blocks 4F is located becomes insusceptible to inclination-deformation, similarly to the aforementioned pneumatic tire having the blocks 4E disposed on the tread portion surface, to thereby ensure the ground-contact area of the tire. Further, the edge component is increased particularly in a portion where the apex 47F of the block 4F is located, and hence the scratch effect to be produced by the edges against a road surface can further be increased. As a result, the scratch effect to be produced by the edges of the blocks 4F and the lateral sipes 42F, 43F, 44F against a road surface can further be increased. Therefore, the ground-contact area of the tire can be ensured while simultaneously improving the scratch effect to be produced by the edge against an icy road, to thereby improve the on-ice friction properties of the tire.

Further, in the pneumatic tire having the blocks 4F disposed on the tread portion surface, a water film to be generated between a road surface and the tire can be effectively removed by the first sipe 43F' which is a bottom-enlarged sipe, similarly to the aforementioned pneumatic tire having the blocks 4E disposed on the tread portion surface. Therefore, a sufficient grip of the tire can also be ensured.

Further, in the pneumatic tire having the blocks 4F disposed on the tread portion surface, a so-called three dimensional sipe is formed in a region on the block width center line WC side relative to the apex 47F of the circumferential protrusion of the block 4F, so that both the sufficient ground-contact area and the scratch effect to be produced by the edges against an icy road can be effectively attained.

The block 4G illustrated in FIG. 8(c) is similar in configuration to the block 4F of FIG. 8(b), except for the following points. That is, the block 4G has first sipes 42G', 43G', 44G' serving as first sipe components opening at one ends thereof to a main groove located on an apex 47G side relative to the width center line WC of the block 4G, of which the first sipes 42G', 44G' forming the circumferential end side lateral sipes 42G, 44G are formed to be bent in the extending direction while being linearly arranged in the depth direction whereas the first sipe 43G' forming the center side lateral sipe 43G is formed linearly in both the extending direction and the depth direction.

Further, the block 4H illustrated in FIG. 8(d) is similarly configuration to the block 4F illustrated in FIG. 8(b) and the block 4G illustrated in FIG. 8(c), except for the following points. That is, as illustrated in section in FIG. 9(d) taken along the line IX-IX of FIG. 8(d), the block 4H has first sipes 42H', 43H', 44H' serving as first sipe components opening at one ends thereof to a main groove located on an apex 47H side relative to the width center line WC of the block 4H, of which the first sipes 42H', 44H' forming the circumferential end side lateral sipes 42H, 44H are three-dimensionally formed so as to be bent in both the extending direction and the depth direction whereas the first sipe 43H' forming the center side lateral sipe 43H is linearly formed in both the extending direction and the depth direction.

Then, in the pneumatic tire having the blocks 4G or the blocks 4H disposed on the tread portion surface, portions where the apexes 47G and 47H of the blocks 4G, 4H are located becomes insusceptible to inclination-deformation, similarly to the aforementioned pneumatic tire having the blocks 4F disposed on the tread portion surface. Therefore, the ground-contact area of the tire can be ensured. Further, the edge components are increased at portions where the apexes 47G and 47H of the blocks 4G, 4H are located, and hence the scratch effect to be produced by the edges against a road surface can further be increased. As a result, the scratch effect to be produced by the edges of the blocks 4G, 4H and the edges of the lateral sipes 42G to 44G, 42H to 44H against a road surface can be effectively improved. Therefore, the ground-contact area of the tire can be ensured while simultaneously improving the scratch effect to be produced by the edges against an icy road, to thereby improve the on-ice friction properties of the tire.

Further, in the pneumatic tire having the blocks 4G or the blocks 4H disposed on the tread portion surface, a water film to be generated between a road surface and the tire can be effectively removed by the first sipes 43G', 43H' which is a bottom-enlarged sipe, similarly to the aforementioned pneumatic tire having the blocks 4F disposed on the tread portions surface. As a result, a sufficient grip of the tire can be ensured. Further, a so-called three dimensional sipe is formed in a region on the block width center line WC side relative to the apexes 47G, 47H of the circumferential protrusions 41G, 41H of the blocks 4G, 4H, so that both the sufficient ground-contact area and the scratch effect to be produced by the edges against an icy road can be effectively attained.

Further, in the pneumatic tire having the blocks 4G disposed on the tread portion surface, the first sipe components 42G', 44G' forming the lateral sipes 42G, 44G located on both end sides of the block 4G in the tire circumferential direction are formed to be bent in the extending direction while being linearly arranged in the depth direction, so that the contact area between the sipe walls along with the deformation of the block 4G is increased, as compared to the case where the first sipe component located on both side in the tire circumferential direction is configured as a sipe linearly extending in both the extending direction and the depth direction. As a result, an excessive inclination-deformation of the block 4G can be suppressed. Therefore, both the sufficient ground-contact area and the scratch effect to be produced by the edges against an icy road can be more effectively attained. Further, in the pneumatic tire having the block 4H disposed on the tread portion surface, the first sipe components 42H', 44H' forming the lateral sipes 42H, 44H located on both end sides of the block 4H in the tire circumferential direction are configured as so-called three-dimensional sipes which are bent in both the extending direction and the depth direction, so that the contact area between the sipe walls along with the deformation of the block 4H is increased, as compared to the case where the first sipe component located on both side in the tire circumferential direction is configured as a sipe linearly extending in the depth direction. As a result, an excessive inclination-deformation of the block 4H can be suppressed. Therefore, both the sufficient ground-contact area and the scratch effect to be produced by the edges against an icy road can be more effectively attained.

In the aforementioned blocks 4F, 4G, 4H, similarly to the block 4E, the second sipe located closest to the apex side in the tire circumferential direction may be terminated, at the other end of the sipe, within the block. Further, the distance by which the apex is offset from the width center line of the block, the overlapping length between the first sipe and the second sipe, and the installation angle $\theta_1$, $\theta_2$ of the two side wall portions (first side wall portion and second side wall portion) forming the side walls may be defined similarly to those of the block 4E. Further, in the blocks 4F, 4G, 4H, similarly to the block 4E, the tire-circumferential-direction dimension L of the block is preferably smaller than the tire-width-direction dimension W of the block. Further, the two circumferential end side lateral sipes located on both end sides of the block in the tire circumferential direction each have a cut depth on the opening side of the sipes, which cut depth are preferably made shallower than the cut depth of the circumferential end side lateral sipes excluding the opening thereof and the cut depth of the center side lateral sipe.

Figure 10:
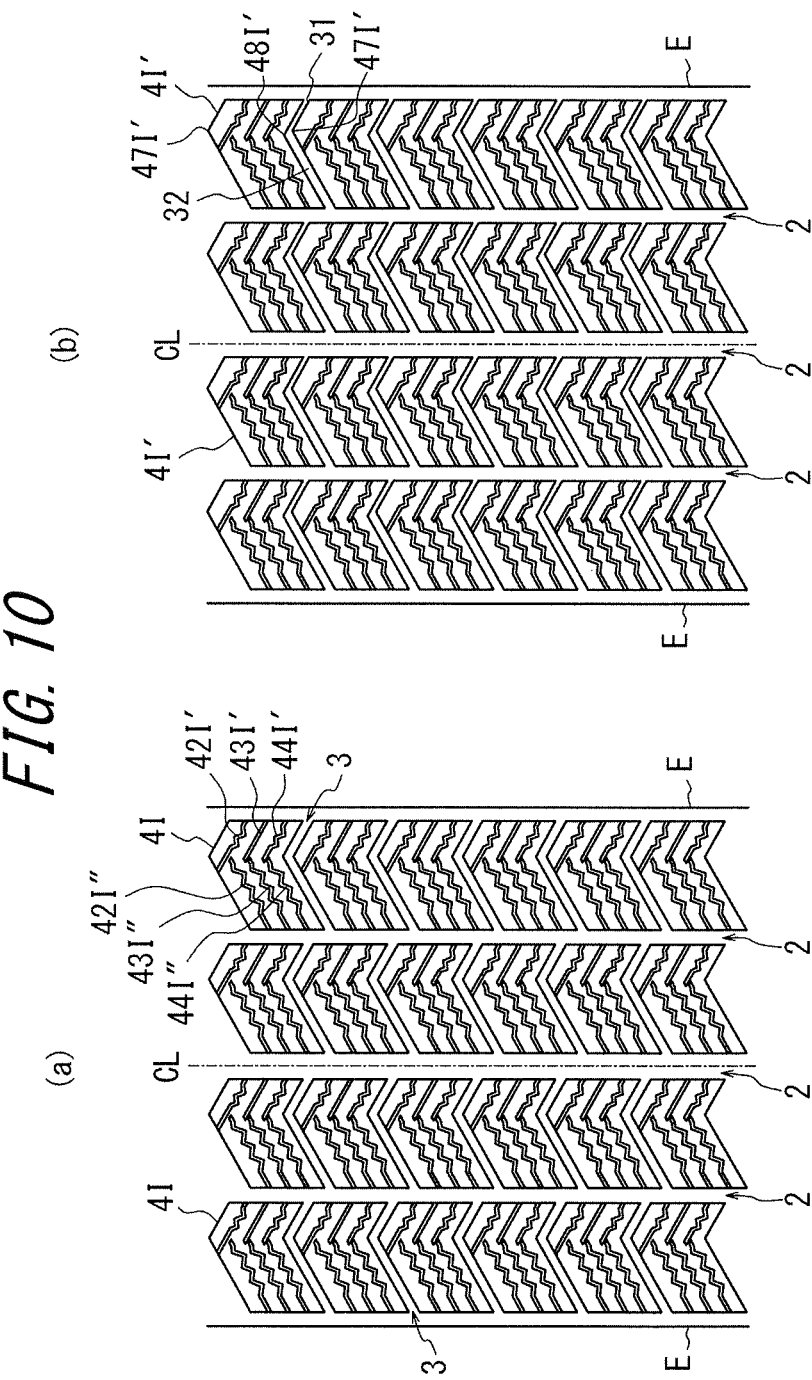

In the case of arranging, on the tread portion surface, the blocks such as aforementioned blocks 4E to 4H each having the apex offset from the width center line of the block, the blocks may be arranged at equal intervals in the tire circumferential direction as illustrated in FIG. 10(a) which shows blocks 4I arranged on the tread portion surface (four rows in total are arranged in FIG. 10(a)). Specifically, the blocks 4I can be partition-formed by a plurality of main grooves 2 extending in the tire circumferential direction and a plurality of lateral grooves 3 each having a uniform groove width in the tire circumferential direction and extending in the tire width direction between the main grooves 2, 2 and/or between the main groove 2 and the tread end E with one bent point in a convex shape in the tire circumferential direction.

Here, the block 4I is similar in configuration to the block 4H illustrated in FIG. 8(d), except for the following points. That is, the first sipes 42I', 43I', 44I' are each located on the circumferential protrusion side relative to the second sipes 42I'', 43I'', 44I'' (that is, the positional relation between the first sipes and the second sipes in the tire circumferential direction is different), the first sipe 42I' opens, at one end thereof, to the main groove 2 or the tread end E on the right in FIG. 10(a) while opening, at the other end thereof, to the lateral groove 3 on the upper side of FIG. 10(a), and the second sipe 42I" opens, at one end thereof, to the main groove 2 or the tread end E on the left in FIG. 10(a) while terminating, at the other end thereof, within the block. Then, the pneumatic tire having the blocks 4I arranged on the tread portion surface is capable of ensuring both the ground-contact area of the tire and the improvement in scratch effect to be produced by the edges against an icy road, as in the case of the aforementioned pneumatic tire having the blocks 4H arranged on the tread portion surface. Further, a water film to be generated between a road surface and the tire can be effectively removed, to thereby ensure a sufficient grip of the tire.

Here, in the pneumatic tire of the present invention, in the case of partition-forming, on the tread portion surface, the blocks each having the apex offset from the width center line of the block, lateral grooves each having a groove width changed within the groove may be used to partition-form the blocks.

That is, referring to FIG. 10(b) which illustrates part of the tread portion surface of the pneumatic tire on which the blocks 4I' having sipes each in the same shape as those of the blocks 4I are arranged similarly to the blocks 4I, the plurality of lateral grooves extending in the tire width direction having one bent point so as to be in a convex shape in the tire circumferential direction, between the plurality of main grooves 2 extending in the tire circumferential direction and/or between the main groove 2 and the tread end E, may be formed of two groove components (a first lateral groove component 31 and a second lateral groove component 32) that are different from each other in groove width in the tire circumferential direction.

Specifically, on the tread portion surface of the pneumatic tire illustrated in FIG. 10(b), the lateral grooves are each formed of the first lateral groove component 31 opening, at one end thereof, to the main groove 2 or the tread end E on an apex 47I' side of a circumferential protrusion relative to the width center line of the block 4I' and the second lateral groove component 32 opening, at one end thereof, to the other main groove 2 or the tread end E. Then, the groove width of the first lateral groove component 31 in the tire circumferential direction is configured to be smaller than the groove width of the second lateral component 32 in the tire circumferential direction. More specifically, the groove width of the first lateral groove component 31 in the tire circumferential direction is set to, for example, about 0.3 mm to 1.0 mm so as to allow the blocks 4I' adjacent to each other in the tire circumferential direction across the lateral groove to come into contact with each other to support each other when the blocks 4I' is subjected to inclination-deformation. Further, the groove width of the second lateral groove component 32 in the tire circumferential direction is set to about 1.5 mm to 5.0 mm.

That is, in this pneumatic tire, in the planar view of the tire, a groove wall on one side (upper side in FIG. 10(b)) of the lateral groove in the tire circumferential direction and a groove wall on the other side (lower side in FIG. 10(b)) each have one bent point convex to the one side in the tire circumferential direction, and the bent points of the groove walls are different from each other in position in the tire width direction. In other words, in this pneumatic tire, the position of the apex 47I' (the offset distance O from the block width center line) of the block 4I' in the tire circumferential direction is different from the position of a concave point 48I' (the offset distance O' from the block width center line) of the block 4I' located on the side opposite to the apex 47I' in the tire circumferential direction. In this lateral groove, a straight line connecting the bent points of the groove walls forms the division between the first lateral groove component 31 and the second lateral groove component 32.

Then, in this pneumatic tire, the first lateral groove component 31 is smaller in groove width, so that the blocks 4I' adjacent to each other in the tire circumferential direction come into contact with each other on the first lateral groove component 31 side to support each other when the blocks 4I' is subjected to inclination-deformation, which increases the block rigidity. Therefore, as in the case of the pneumatic tire having the aforementioned blocks 4I arranged on the tread portion surface, the tire can be improved in dry-road performance or wet-road performance, in particular, braking performance while also being improved in on-ice performance.

Figure 14:
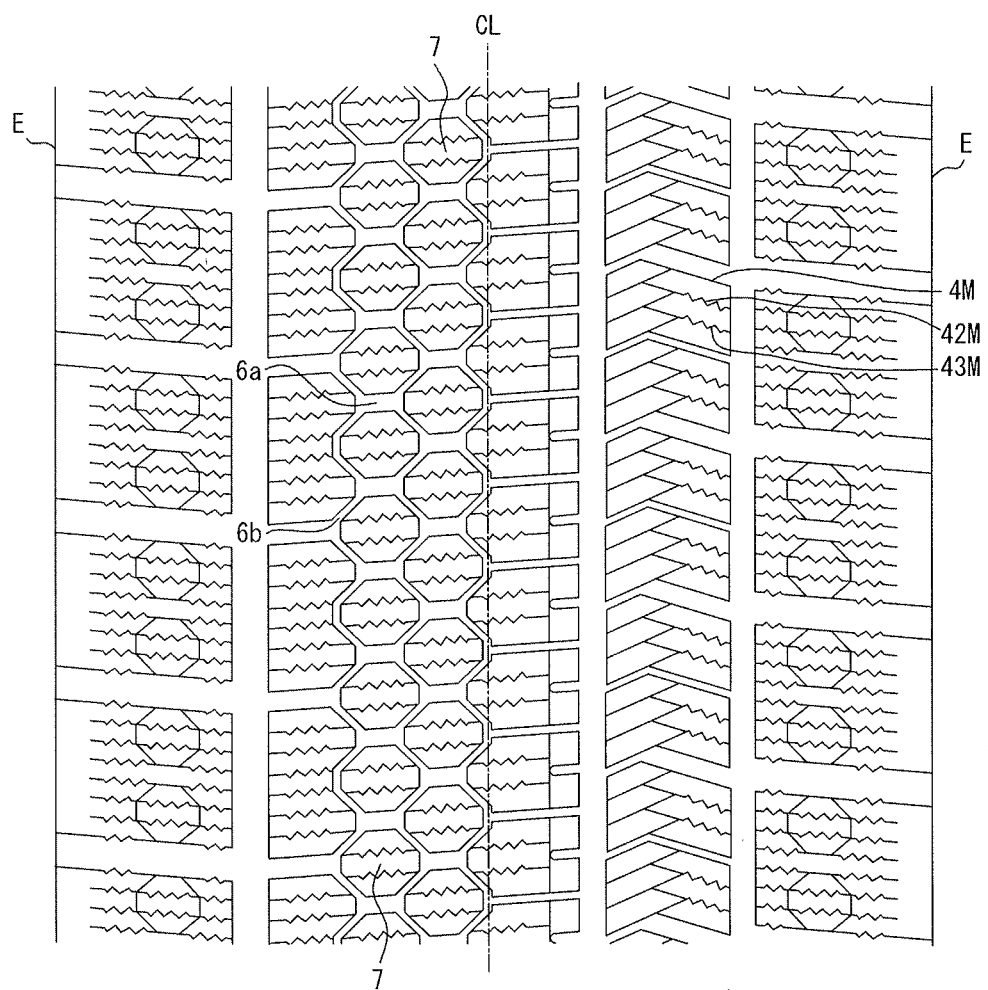
FIG. 14 A development view illustrating part of a tread portion of another pneumatic tire according to the present invention.

The embodiments of the present invention have been described above with reference to the drawings. However, the pneumatic tire of the present invention may be subjected to alterations as appropriate, without being limited to the illustrated examples. Further, the installation direction of the blocks, the block shapes, and the sipe shapes described above may be combined as appropriate for use. Further, the bottom-enlarged sipe may be formed as a sipe which is bent in the extending direction or in the depth direction while having an enlarged portion formed at the bottom thereof. Further, when the lateral sipe is formed as a combined lateral sipe, any of the first sipe and the second sipe may be disposed on the circumferential protrusion side. Further, the aforementioned blocks may be disposed only in part of the tread portion surface. Specifically, as illustrated in FIG. 14, the aforementioned blocks may be used in combination with a polygonal block group including a plurality of closely-spaced octagonal blocks 7 in plan view which are partitioned by a first narrow groove 6a and a second narrow groove 6b. In FIG. 14, reference symbol 4M denotes a block in an arrow feathers shape having an apex offset from the width center line of the block and two lateral sipes 42M, 43M. Further, the first narrow groove 6a refers to a groove extending substantially in the tire width direction between the octagonal blocks 7, and the second narrow groove 6b refers to a groove intersecting with the first narrow groove 6a. Then, the first narrow groove 6a and the second narrow groove 6b each have a groove width large enough to allow the adjacent blocks 7 to be movable independently from each other without being mutually restrained completely, and the groove width may preferably be 0.7 mm to 3 mm. Then, when mounting the pneumatic tire with the tread portion surface configured as described above to a vehicle, the tire is assembled in such a manner that the polygonal block group is located inside the vehicle than the blocks 4M in the arrow feathers shape.

EXAMPLES

In the following, the present invention is further described with reference to Examples. However, the present invention is no way limited to the following Examples.

Example 1

A pneumatic tire in a size of 195/65R15 having a tread portion surface 1 configured as illustrated in FIG. 1 was manufactured as a sample according to the specifications shown in Table 1, which was then subjected to performance evaluation by the following method. Table 1 shows the results thereof.

Examples 2 to 5

A pneumatic tire in a size of 195/65R15 was manufactured as a sample in a similar manner to Example 1, except in that the installation angle $\theta_1$ of the first side wall portion and the installation angle $\theta_2$ of the second side wall portion of the block in a shape illustrated in FIGS. 1 to 2 were changed as shown in Table 1. The tire thus manufactured was then subjected to performance evaluation by the following method. Table 1 shows the results thereof.

Conventional Example 1

Figure 11:
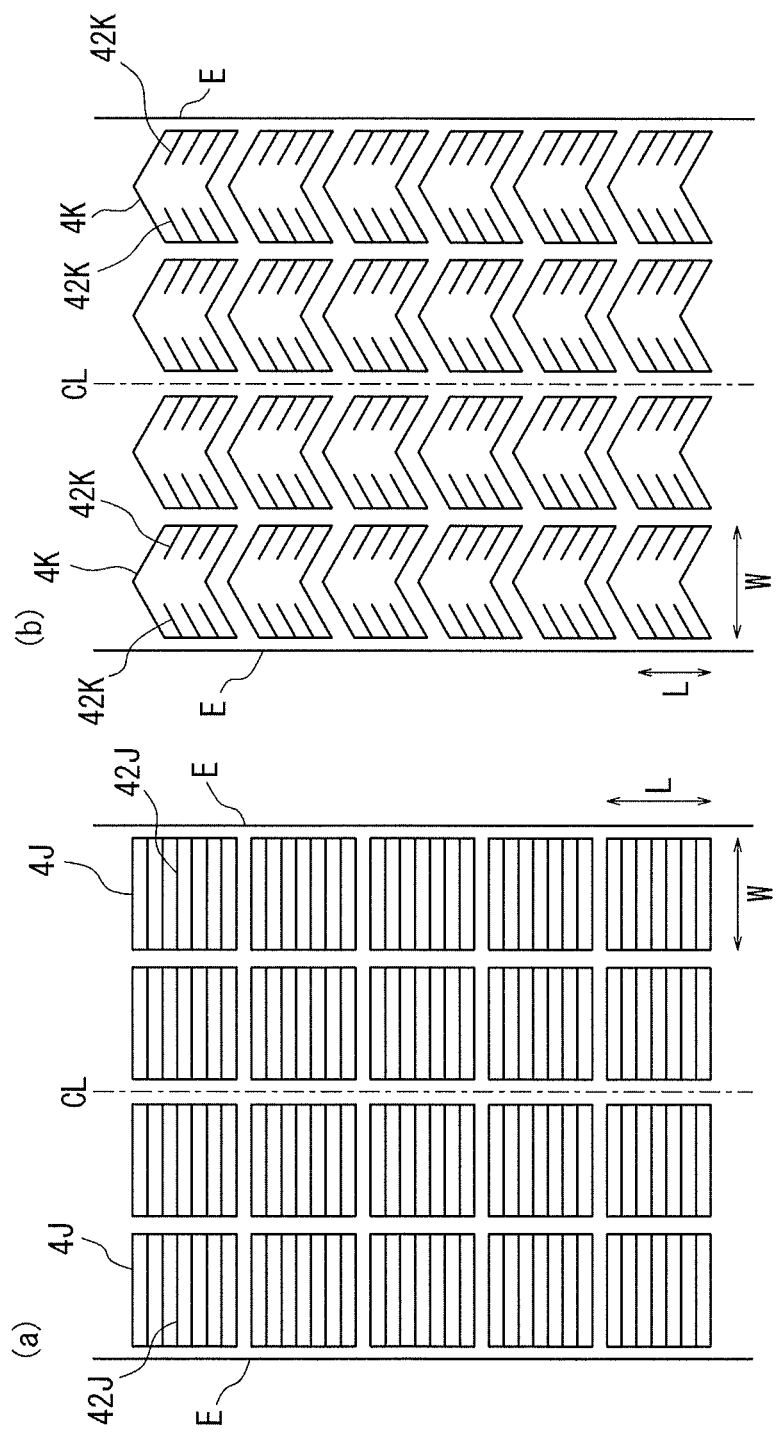

A pneumatic tire in a size of 195/65R15 having a tread portion surface 1 configured as illustrated in FIG. 11(a) was manufactured as a sample according to the specifications shown in Table 1, which was then subjected to performance evaluation by the following method. Table 1 shows the results thereof. In FIG. 11(a), rectangular blocks are each denoted by 4J while lateral sipes are each denoted by 42J.

Comparative Example 1

A pneumatic tire in a size of 195/65R15 having a tread portion surface 1 configured as illustrated in FIG. 11(b) was manufactured as a sample according to the specifications shown in Table 1, which was then subjected to performance evaluation by the following method. Table 1 shows the results thereof. In FIG. 11(b), blocks are each denoted by 4K while lateral sipes are each denoted by 42K.

<On-Ice Braking Performance>

The tires manufactured as Examples 1 to 5, Conventional Example 1, and Comparative Example 1 were each mounted on a rim of a size of 15×6J, which is then mounted on a vehicle with an internal pressure of 200 kPa. Then, a full-brake was applied to the tire traveling at 40 km/h on an icy road so as to measure the braking distance to a full stop. Based on the speed before the application of full-brake and the braking distance, an average deceleration was obtained. Then, the average deceleration thus obtained was indexed, with a score of 100 representing the average deceleration of Conventional Example 1. In Table 1, a larger value shows more excellent on-ice braking performance.

ing performance can further be improved with the installation angle of the side wall portion being set to 15° to 45°.

Example 6

Figure 12:
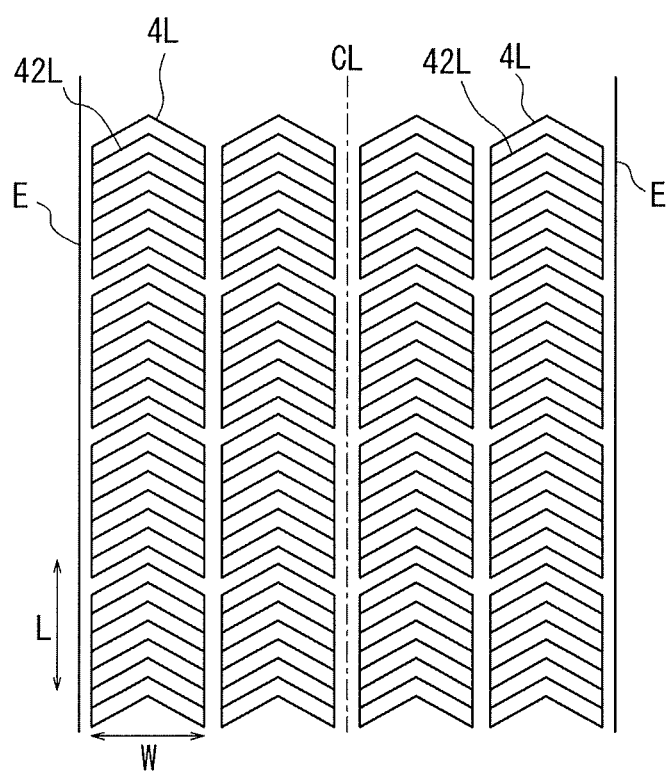
FIG. 12 A development view illustrating part of a tread portion of a pneumatic tire as an example.

A pneumatic tire in a size of 195/65R15 was manufactured as a sample, similarly to Example 1, except in that the block was changed in tire-circumferential-direction dimension L and in tire-width-direction dimension W as shown in Table 2 and six lateral sipes were provided as illustrated in FIG. 12. The pneumatic tire thus manufactured was subjected to performance evaluation by a method similar to that of Example 1. Table 2 shows the results thereof. It should be noted that the block shapes shown in FIG. 12 are exaggerated. Further, in FIG. 12, blocks are each denoted by 4L, while lateral sipes are all denoted by 42L.

Example 7

A pneumatic tire in a size of 195/65R15 was manufactured as a sample, similarly to Example 1, except in that the block was changed in tire-circumferential-direction dimension L and in tire-width-direction dimension W as shown in Table 2 and five lateral sipes were provided. The pneumatic tire thus manufactured was subjected to performance evaluation by a method similar to that of Example 1. Table 2 shows the results thereof.

Examples 8 and 9

A pneumatic tire in a size of 195/65R15 was manufactured as a sample, similarly to Example 1, except in that the block was changed in tire-circumferential-direction dimension L and in tire-width-direction dimension W as shown in Table 2

TABLE 1

|  | Conventional Example 1 | Comparative Example 1 | Example 1 | Example 2 | Example 3 | Example 4 | Example 5 |
|---|---|---|---|---|---|---|---|
| Block shape | FIG. 11(a) | FIG. 11(b) | FIGS. 1, 2 | FIGS. 1, 2 | FIGS. 1, 2 | FIGS. 1, 2 | FIGS. 1, 2 |
| Tire-circumferential-direction dimension L [mm] | 30 | 30 | 17.6 | 17.6 | 17.6 | 17.6 | 17.6 |
| Tire-width-direction dimension W [mm] | 24 | 24 | 24 | 24 | 24 | 24 | 24 |
| Installation angle of first side wall portion $\theta_1$ [°] | — | 30 | 30 | 10 | 15 | 45 | 50 |
| Installation angle of second side wall portion $\theta_2$ [°] | — | 30 | 30 | 10 | 15 | 45 | 50 |
| Offset distance O of apex [mm] | — | — | — | — | — | — | — |
| Overlapping length between first sipe and second sipe in the tire width direction [mm] | — | — | — | — | — | — | — |
| On-ice braking performance | 100 | 101 | 107 | 103 | 105 | 105 | 102 |

Examples 1 to 5, Conventional Example 1, and Comparative Example 1 of Table 1 show that the present invention is capable of providing a pneumatic tire excellent in on-ice braking performance, and further show that the on-ice brakwithout changing the number of lateral sipes from three. The pneumatic tire thus manufactured was subjected to performance evaluation by a method similar to that of Example 1. Table 2 shows the results thereof.

TABLE 2

|  | Example 6 | Example 7 | Example 8 | Example 9 |
|---|---|---|---|---|
| Block shape | FIG. 12 *1 | FIGS. 1, 2 *2 | FIGS. 1, 2 | FIGS. 1, 2 |
| Tire-circumferential-direction dimension L [mm] | 24.5 | 21 | 10.5 | 9 |
| Tire-width-direction dimension W [mm] | 24 | 24 | 24 | 24 |
| Installation angle of first side wall portion $\theta_1$ [°] | 30 | 30 | 30 | 30 |
| Installation angle of second side wall portion $\theta_2$ [°] | 30 | 30 | 30 | 30 |
| Offset distance O of apex [mm] | — | — | — | — |
| Overlapping length between first sipe and second sipe in the tire width direction [mm] | — | — | — | — |
| On-ice braking performance | 103 | 105 | 105 | 102 |

*1 Number of lateral sipes: 6
*2 Number of lateral sipes: 5

Examples 6 to 9, in particular, Examples 6 to 7 of Table 2 show that the pneumatic tire of the present invention can be further improved in on-ice braking performance when the tire-width-direction dimension W of the block is larger than the tire-circumferential-direction dimension L.

Examples 10 to 14

A pneumatic tire in a size of 195/65R15 was manufactured as a sample, similarly to Example 1, except in that the block was formed in a shape as illustrated in FIG. 4(a) in which the apex is offset, and the offset distance O was defined as shown in Table 3. The pneumatic tire thus manufactured was subjected to performance evaluation by a method similar to that of Example 1. Table 3 shows the results thereof.

TABLE 3

|  | Example 10 | Example 11 | Example 12 | Example 13 | Example 14 |
|---|---|---|---|---|---|
| Block shape | FIG. 4(a) | FIG. 4(a) | FIG. 4(a) | FIG. 4(a) | FIG. 4(a) |
| Tire-circumferential-direction dimension L [mm] | 17.6 | 17.6 | 17.6 | 17.6 | 17.6 |
| Tire-width-direction dimension W [mm] | 24 | 24 | 24 | 24 | 24 |
| Installation angle of first side wall portion $\theta_1$ [°] | 30 | 30 | 30 | 30 | 30 |
| Installation angle of second side wall portion $\theta_2$ [°] | 30 | 30 | 30 | 30 | 30 |
| Offset distance O of apex [mm] | 4.0 | 1.5 | 2.5 | 7.0 | 8.0 |
| Overlapping length between first sipe and second sipe in the tire width direction [mm] | — | — | — | — | — |
| On-ice braking performance | 110 | 107 | 109 | 109 | 107 |

Examples 10 to 14 in Table 3 show that the on-ice braking performance of the tire can further be improved by offsetting the apex of the block by a predetermined distance in the pneumatic tire of the present invention.

Examples 15 and 16

A pneumatic tire in a size of 195/65R15 was manufactured as a sample, similarly to Example 1, except in that the block was formed in a shape as shown in FIG. 4(b), and the overlapping length between the first sipe and the second sipe were defined as shown in Table 4. The pneumatic tire thus manufactured was subjected to performance evaluation by a method similar to that of Example 1. Table 4 shows the results thereof.

Example 17

A pneumatic tire in a size of 195/65R15 was manufactured as a sample, similarly to Example 1, except in that the block was formed in a shape as shown in FIG. 4(c), and the offset distance O and the overlapping length between the first sipe and the second sipe was defined as shown in Table 4. The pneumatic tire thus manufactured was subjected to performance evaluation by a method similar to that of Example 1. Table 4 shows the results thereof.

Example 18

A pneumatic tire in a size of 195/65R15 was manufactured as a sample, similarly to Example 1, except in that the block was formed in a shape as shown in FIG. 4(d) and the offset distance O and the overlapping length between the first sipe and the second sipe were defined as shown in Table 4. The pneumatic tire thus manufactured was subjected to performance evaluation by a method similar to that of Example 1. Table 4 shows the results thereof.

Example 19

Figure 6:
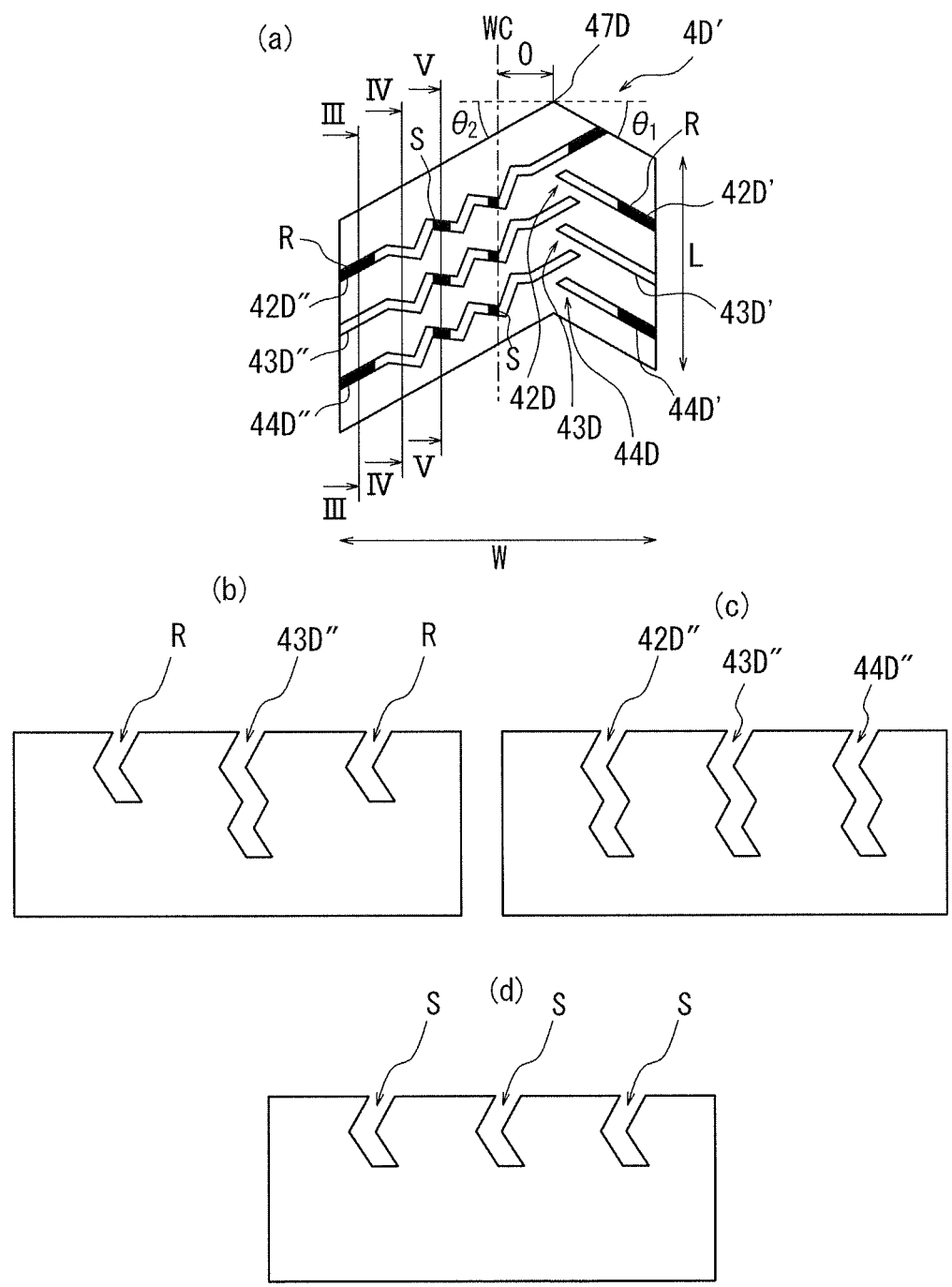

A pneumatic tire in a size of 195/65R15 was manufactured as a sample, similarly to Example 18, except in that a block was formed in a shape as shown in FIG. 4(d) with a lateral sipe provided only with a slit portion S illustrated in FIG. 6. The pneumatic tire thus manufactured was subjected to performance evaluation by a method similar to that of Example 18. Table 4 shows the results thereof. Here, the depth of the slit portion was 3 mm, and the depth of the lateral sipe except for the slit portion was 7 mm.

Example 20

A pneumatic tire in a size of 195/65R15 was manufactured as a sample, similarly to Example 18, except in that the block was formed in a shape provided with the slit portion S and a raised-bottom portion R shown in FIG. 6(a). The pneumatic tire thus manufactured was subjected to performance evaluation by a method similar to that of Example 18. Table 4 shows the results thereof. The depth of the slit portion was 3 mm, the depth of the raised-bottom portion was 2 mm, and the depth of the lateral sipe except for the slit portion and the raised-bottom portion was 7 mm.

TABLE 4

| | Example 15 | Example 16 | Example 17 | Example 18 | Example 19 | Example 20 |
|---|---|---|---|---|---|---|
| Block shape | FIG. 4(b) | FIG. 4(b) | FIG. 4(c) | FIG. 4(d) | FIG. 4(d) *3 | FIG. 6(a) |
| Tire-circumferential-direction dimension L [mm] | 17.6 | 17.6 | 17.6 | 17.6 | 17.6 | 17.6 |
| Tire-width-direction dimension W [mm] | 24 | 24 | 24 | 24 | 24 | 24 |
| Installation angle of first side wall portion $\theta_1$ [°] | 30 | 30 | 30 | 30 | 30 | 30 |
| Installation angle of second side wall portion $\theta_2$ [°] | 30 | 30 | 30 | 30 | 30 | 30 |
| Offset distance of apex O [mm] | — | — | 4 | 4 | 4 | 4 |
| Overlapping length between first sipe and second sipe in the tire width direction [mm] | 3.5 | 1.0 | 3.5 | 3.5 | 3.5 | 3.5 |
| On-ice braking performance | 109 | 108 | 111 | 114 | 117 | 121 |

*3 Slit portions are provided to lateral sipe

Examples 15 and 16 of Table 4 show that the pneumatic tire of the present invention can further be improved in on-ice braking performance when the first sipe and the second sipe are overlapped each other. Further, Examples 17 and 18 show that the pneumatic tire of the present invention having the offset apex with the first sipe and the second sipe being overlapped each other can further be improved in on-ice braking performance. Further, Examples 17 and 18 show that the second sipe configured as a so-called three-dimensional sipe is capable of further improving the on-ice braking performance. Examples 19 and 20 show that the pneumatic tire of the present invention can further be improved in on-ice braking performance when the slit portion and the raised-bottom portion are formed in the blocks.

Example 21

A pneumatic tire in a size of 195/65R15 was manufactured as a sample according to the specifications shown in Table 5, having a tread portion surface as illustrated in FIG. 1, except in that the center side lateral sipe is configured as a bottom-enlarged sipe. The pneumatic tire thus manufactured was subjected to performance evaluation by the following method. Table 5 shows the results thereof.

Examples 22 to 25

A pneumatic tire in a size of 195/65R15 was manufactured similarly to
Example 21, except in that the block was formed in a shape as shown in FIGS. 8(a) to 8(d) and the overlapping length between the first sipe and the second sipe was defined as shown in Table 5. The pneumatic tire thus manufactured was subjected to performance evaluation by a method similar to that of Example 21. Table 5 shows the results thereof.

<On-Ice Braking Performance>

The tires manufactured as Example 1, Examples 21 to 25, and Conventional Example 1 were each mounted on a rim in a rim size of 15×6J, which is then mounted on a vehicle with an internal pressure of 200 kPa. Then, a full-brake was applied to the tire traveling at 40 km/h on an icy road so as to measure the braking distance to a full stop. Based on the speed before the application of full-brake and the braking distance, an average deceleration was obtained. Then, the average deceleration thus obtained was indexed, with a score of 100 representing the average deceleration of Conventional Example 1. In Table 5, a larger value shows more excellent on-ice braking performance.

<Dry Braking Performance>

The pneumatic tires manufactured as Example 1, Examples 21 to 25, and Conventional Example 1 were each mounted on a rim in a rim size of 15×6J, which is then mounted on a vehicle with an internal pressure of 200 kPa. Then, a full-brake was applied to the tire traveling at 80 km/h on a dry road so as to measure the braking distance to a full stop. Based on the speed before the application of full-brake and the braking distance, an average deceleration was obtained. Then, the average deceleration thus obtained was indexed, with a score of 100 representing the average deceleration of Conventional Example 1. In Table 5, a larger value shows more excellent dry braking performance.

<Wet Braking Performance>

The pneumatic tires manufactured as Example 1, Examples 21 to 25, and Conventional Example 1 were each mounted on a rim in a rim size of 15×6J, which is then mounted on a vehicle with an internal pressure of 200 kPa. Then, a full-brake was applied to the tire traveling at 80 km/h on a wet road so as to measure the braking distance to a full stop. Based on the speed before the application of full-brake and the braking distance, an average deceleration was obtained. Then, the average deceleration thus obtained was indexed, with a score of 100 representing the average deceleration of Conventional Example 1. In Table 5, a larger value shows more excellent wet braking performance.

TABLE 5

|  | Conventional Example 1 | Example 1 | Example 21 | Example 22 | Example 23 | Example 24 | Example 25 |
|---|---|---|---|---|---|---|---|
| Block shape | FIG. 11(a) | FIGS. 1, 2 | FIGS. 1, 2 *4 | FIG. 8(a) | FIG. 8(b) | FIG. 8(c) | FIG. 8(d) |
| Tire-circumferential-direction dimension L [mm] | 30 | 17.6 | 17.6 | 17.6 | 17.6 | 17.6 | 17.6 |
| Tire-width-direction dimension W [mm] | 24 | 24 | 24 | 24 | 24 | 24 | 24 |
| Installation angle of first side wall portion $\theta_1$ [°] | — | 30 | 30 | 30 | 30 | 30 | 30 |
| Installation angle of second side wall portion $\theta_2$ [°] | — | 30 | 30 | 30 | 30 | 30 | 30 |
| Offset distance O of apex [mm] | — | — | — | 4 | 4 | 4 | 4 |
| Overlapping length between first sipe and second sipe in the tire width direction [mm] | — | — | — | 3.5 | 3.5 | 3.5 | 3.5 |
| On-ice braking performance | 100 | 107 | 109 | 115 | 118 | 121 | 123 |
| Dry braking performance | 100 | 104 | 109 | 114 | 124 | 130 | 130 |
| Wet braking performance | 100 | 105 | 108 | 114 | 120 | 127 | 128 |

*4 The center side lateral sipe located at the center in the tire circumferential direction is configured a bottom-enlarge sipe.

Table 5 shows that the pneumatic tires of Examples 21 to 25 are improved in on-ice braking performance as compared to the pneumatic tire of Conventional Example 1 which has rectangular-block having sipes linearly extending in both the extending direction (tire width direction) and the depth direction, and the pneumatic tire of Example 1. Further, the pneumatic tires of Examples 21 to 25 are also improved in dry braking performance and wet braking performance because the blocks are inclined as appropriate to thereby ensure an adequate ground-contact area.

Example 26

A pneumatic tire in a size of 195/65R15 was manufactured as a sample, similarly to Example 21, except in that the tread portion surface is configured as shown in FIG. 10(a). Then, the tire thus manufactured was subjected to performance evaluation by a method similar to that of Example 21, except in that the obtained values were indexed with a score of 100 representing the average deceleration of the tire of Example 26. Table 6 shows the results thereof.

Example 27

A pneumatic tire in a size of 195/65R15 was manufactured as a sample, similarly to Example 21, except in that the tread portion surface is configured as shown in FIG. 10(b) and the groove widths of the first lateral groove component and the second lateral groove component were defined as shown in Table 6. Then, the tire thus manufactured was subjected to performance evaluation by a method similar to that of Example 21, except in that the obtained values were indexed with a score of 100 representing the average deceleration of the tire of Example 26. Table 6 shows the results thereof.

TABLE 6

|  | Example 26 | Example 27 |
|---|---|---|
| Block shape | FIG. 10(a) | FIG. 10(b) |
| Tire-circumferential-direction dimension L [mm] | 17.6 | 17.6 |
| Tire-width-direction dimension W [mm] | 24 | 24 |
| Installation angle of first side wall portion $\theta_1$ [°] | 30 | 30 |
| Installation angle of second side wall portion $\theta_2$ [°] | 30 | 30 |
| Offset distance O of apex [mm] | 4 | 5 |
| Offset distance O' of concave point [mm] | 4 | 4 |
| Overlapping length between first sipe and second sipe in the tire width direction [mm] | 3.5 | 3.5 |
| Groove width of the first lateral groove component [mm] | 2 | 0.5 |
| Groove width of the second lateral groove component [mm] | 2 | 2 |
| On-ice braking performance | 100 | 100 |
| Dry braking performance | 100 | 104 |
| Wet braking performance | 100 | 103 |

Table 6 shows that the pneumatic tire of Example 27 is more excellent in dry braking performance and wet braking performance as compared to the pneumatic tire of Example 26.

INDUSTRIAL APPLICABILITY

The present invention is capable of providing a pneumatic tire improved in on-ice friction properties of the tire, which is excellent in on-ice performance, in particular, on-ice braking performance.

| DESCRIPTION OF SYMBOLS | |
|---|---|
| 1 | tread surface of tread portion |
| 1A | tread surface of tread portion |
| 1B | tread surface of tread portion |
| 2 | main groove |
| 3 | lateral groove |
| 4 | block |
| 4A to 4M | block |
| 5 | block land portion row |
| 5a to 5d | block land portion row |
| 5a' to 5d' | block land portion row |
| 6a, 6b | narrow groove |
| 7 | block |
| 31 | first lateral groove component |
| 32 | second lateral groove component |
| 41 | circumferential protrusion |
| 42 | lateral sipe |
| 42A to 42L | lateral sipe |
| 43A to 43H | lateral sipe |
| 44A to 44H | lateral sipe |
| 42B' to 42I' | first sipe |
| 42B" to 42I" | second sipe |
| 43 | lateral sipe |
| 43A to 43H | lateral sipe |
| 43B' to 43I' | first sipe |
| 43B" to 43I" | second sipe |
| 44 | lateral sipe |
| 44A to 44H | lateral sipe |
| 44B' to 44I' | first sipe |
| 44B" to 44I" | second sipe |
| 43a | enlarged portion |
| 45 | first side wall portion |

-continued

| DESCRIPTION OF SYMBOLS | |
|---|---|
| 45A to 45H | first side wall portion |
| 46 | second side wall portion |
| 46A to 46H | second side wall portion |
| 47 | apex |
| 47A to 47I' | apex |
| 48I' | concave point |
| 70 | block |
| CL | tire equator |
| WC | block width center line |
| S | slit portion |
| R | raised-bottom portion |

The invention claimed is:

1. A pneumatic tire comprising, at least in part of a tread portion surface located between both tread ends:
   a plurality of main grooves extending in a tire circumferential direction; and
   a plurality of lateral grooves extending in a tire width direction, the lateral grooves each having one bent point so as to be in a convex shape in the tire circumferential direction between the main grooves and/or between one of the main grooves and a tread end,
   the plurality of main grooves and the plurality of lateral grooves partition-forming a plurality of blocks each having a circumferential protrusion in a shape conforming to the convex shape of the lateral groove,
   the lateral grooves including a first lateral groove portion and a second lateral groove portion, the first lateral groove portion extending from the apex of the circumferential protrusion to one of the main grooves or the tread end, the second lateral groove portion extending from the apex of the circumferential protrusion to another main groove or the tread end,
   the blocks each having at least one pair of lateral sipes extending in the tire width direction in a shape conforming to the lateral grooves,
   the pair of lateral sipes includes a first sipe and a second sipe, the first sipe having one end thereof opened to one of the main grooves or to the tread end in the tire width direction and the other end thereof terminated within the block or opened to a lateral groove, the second sipe having one end thereof opened to another main groove located on an opposite side of the block from the main groove in the width direction or the tread end and the other end thereof terminated within the block or opened to a lateral groove,
   wherein the total length of the pair of lateral sipes is equal in tire-width-direction dimension to the block having the lateral sipe disposed therein when both are projected onto the same plane which includes the tire rotation axis and is perpendicular to the block surface,
   wherein the first sipe extends along the first lateral groove and the second sipe extends along the second lateral groove, the first sipe and the second sipe being non-parallel with each other,
   wherein the first sipe has a tire-width-dimensional component overlapping with a tire-width-dimensional component of the second sipe in an area where the apex is located in the tire width direction, in a projection view obtained by projecting the first sipe and the second sipe onto the same plane which includes the tire rotation axis and is perpendicular to the block surface,
   wherein the block has at least three lateral sipes formed therein, and at least one of the lateral sipes located between lateral sipes located on both ends of the block in the tire circumferential direction is formed as a bottom-enlarged sipe having an enlarged portion at the bottom thereof, and
   wherein the lateral sipes located on both ends of the block in the circumferential direction are not bottom-enlarged sipes.

2. The pneumatic tire according to claim 1, wherein the block is larger in dimension in the tire width direction than in the tire circumferential direction.

3. The pneumatic tire according to claim 1, wherein the block has a side wall located on the circumferential protrusion side, the side wall including two side wall portions that are different from each other in installation angle, and the side wall portions are installed toward the apex of the circumferential protrusion at installation angles each falling within a range of 15° to 45° relative to the tire width direction.

4. The pneumatic tire according to claim 1, wherein the apex of the circumferential protrusion is disposed as being offset from a width center line of the block by 10% to 30% of the block width.

5. The pneumatic tire according to claim 4, wherein the second sipe is three-dimensionally formed so as to be bent in both the extending direction and the depth direction.

6. The pneumatic tire according to claim 5, wherein the second sipe has a slit portion with a cut depth shallower than other portions in the second sipe.

7. The pneumatic tire according to claim 4,
   wherein the block has three or more pairs of the lateral sipes,
   wherein the first sipes on both ends of the block in the tire circumferential direction are bent in the extending direction while linearly arranged in the depth direction, or three-dimensionally formed so as to be bent in both the extending direction and the depth direction.

8. The pneumatic tire according to claim 4,
   wherein the first lateral groove portion has a groove width narrower than the groove width of the second lateral groove portion.

9. The pneumatic tire according to claim 1,
   wherein the block has two or more pairs of the lateral sipes,
   wherein the lateral sipes located on both ends of the block in the tire circumferential direction each have a cut depth on the opening portion side shallower than at least one of the cut depth of a portion other than the opening portion side of the lateral sipes on both end sides in the tire circumferential direction and the cut depth of the other sipes.

* * * * *